United States Patent
Wang et al.

(10) Patent No.: US 9,258,810 B2
(45) Date of Patent: *Feb. 9, 2016

(54) LOW COMPLEXITY UNIFIED CONTROL CHANNEL PROCESSING

(71) Applicant: QUALCOMM Incorporated, San Diego, CA (US)

(72) Inventors: Renqiu Wang, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 287 days.

This patent is subject to a terminal disclaimer.

(21) Appl. No.: 13/856,913

(22) Filed: Apr. 4, 2013

(65) Prior Publication Data

US 2013/0230000 A1    Sep. 5, 2013

Related U.S. Application Data

(62) Division of application No. 12/815,205, filed on Jun. 14, 2010, now Pat. No. 8,437,332.

(60) Provisional application No. 61/219,352, filed on Jun. 22, 2009.

(51) Int. Cl.
H04W 72/04        (2009.01)
H04L 5/00         (2006.01)
H04L 27/26        (2006.01)

(52) U.S. Cl.
CPC .......... *H04W 72/042* (2013.01); *H04L 5/0053* (2013.01); *H04L 27/2613* (2013.01)

(58) Field of Classification Search
CPC  H04W 72/042; H04L 5/0053; H04L 27/2613
See application file for complete search history.

(56) References Cited

U.S. PATENT DOCUMENTS 8,437,332  B2    5/2013  Wang et al.
2007/0036064 A1  2/2007  Song et al.
(Continued)

FOREIGN PATENT DOCUMENTS

CN    101383665 A      3/2009
EP       1063791 A2   12/2000
(Continued)

OTHER PUBLICATIONS

3rd Generation Partnership Project; Technical Specification Group Radio Access Network; Evolved Universal Terrestrial Radio Access (E-UTRA); Physical Channels and Modulation (Release 8), 3GPP TS 36.21 1 V8.9.0 (Dec. 2009).
(Continued)

*Primary Examiner* — Jianye Wu

(57) ABSTRACT

Systems and methodologies are described that facilitate unified, low-complexity processing (e.g., user separation and noise estimation) of a control channel. One or more UEs can respectively transmit one or more control signals, which are multiplexed on a control channel and a base station can receive a control channel signal that includes the one or more control signals. The base station, in a single pass, can separate the control signals by matching the control channel signal with a base sequence and translating the matched signal to a time-domain representation. In the time-domain representation, each control signal resides at a different tap. Further, the base station can identify taps of the time-domain representation corresponding to an unused cyclic shift or orthogonal cover sequence. Such taps can be employed to generate a noise and/or interference estimate.

10 Claims, 18 Drawing Sheets

(56) References Cited

U.S. PATENT DOCUMENTS

| | | | |
|---|---|---|---|
| 2008/0279170 A1* | 11/2008 | Malladi et al. | 370/343 |
| 2009/0022135 A1* | 1/2009 | Papasakellariou et al. | 370/344 |
| 2009/0068056 A1 | 3/2009 | Popov et al. | |
| 2009/0068956 A1* | 3/2009 | Naito et al. | 455/67.11 |
| 2010/0255867 A1 | 10/2010 | Ishii et al. | |

FOREIGN PATENT DOCUMENTS

| | | |
|---|---|---|
| EP | 2101417 A2 | 9/2009 |
| JP | 2001008262 A | 1/2001 |
| JP | 2003347969 A | 12/2003 |
| JP | 2003348056 A | 12/2003 |
| JP | 2006500870 A | 1/2006 |
| JP | 2009065403 A | 3/2009 |
| JP | 2009224830 A | 10/2009 |
| WO | WO-2004002000 A1 | 12/2003 |
| WO | WO-2004029554 A2 | 4/2004 |
| WO | WO-2008025373 A1 | 3/2008 |
| WO | WO-2008149314 A2 | 12/2008 |
| WO | WO-2009057483 A1 | 5/2009 |

OTHER PUBLICATIONS

ETRI, "Cyclic-shift hopping for uplink 1-41 sounding reference signal", 3GPP Draft, RI-070748, 3rd Generation Partnership Project (3GPP), Mobile Competence Centre, 650, Route Des Lucioles, F-06921 Sophia-Antipolis Cedex, France, vol. RAN WGI, No. St. Louis, USA, Feb. 6, 2007, XP050104778.

International Search Report and Written Opinion—PCT/US2010/039519, International Search Authority—European Patent Office—Feb. 17, 2011.

KDDI, "Uplink Data-non-associated Control Signaling in E-UTRA", 3GPP TSG-RAN WG1 Meeting #49bis,Jun. 25, 2007,R1-073072.

NEC Group, "Definition of cyclic shift in code division multiplexing", 3GPP TSG RAN WGI Meeting 47, RIGA, vol. R1-063202, No. 47, Nov. 6, 2006, pp. 1-4, XP002505590.

NEC Group, "Definition of Cyclic Shift in Code Division Multiplexing", 3GPP TSG-RAN WG1 Meeting #47bis,Jan. 15, 2007,R1-070359.

Taiwan Search Report—TW099120316—TIPO—Oct. 30, 2013.

* cited by examiner

LOW COMPLEXITY UNIFIED CONTROL CHANNEL PROCESSING

CLAIM OF PRIORITY UNDER 35 U.S.C. §119 and §120

The present Application is a Divisional Application of U.S. Ser. No. 12/815,205, filed Jun. 14, 2010, entitled "LOW COMPLEXITY UNIFIED CONTROL CHANNEL PROCESSING" which claims priority to U.S. Provisional Application Ser. No. 61/219,352, filed Jun. 22, 2009, entitled "SYSTEMS AND METHODS OF LOW COMPLEXITY UNIFIED PROCESSING FOR LTE UPLINK PUCCH CHANNELS." The aforementioned U.S. Applications are assigned to the assignee hereof and hereby expressly incorporated by reference in their entirety.

BACKGROUND

I. Field

The following description relates generally to wireless communications systems, and more particularly to a low complexity, unified processing technique for an uplink control channel in wireless communications systems.

II. Background

Wireless communication systems are widely deployed to provide various types of communication content such as voice and data. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like. Additionally, the systems can conform to specifications such as third generation partnership project (3GPP), 3GPP2, High Speed Packet Access (HSPA), High Speed Downlink Packet Access (HSDPA), High Speed Uplink Packet Access (HSUPA), 3GPP long-term evolution (LTE), LTE Advanced (LTE-A), etc.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations.

A base station can transmit control information, or signaling, on a downlink control channel to one or more mobile devices. Similarly, a mobile device can transmit control information or signaling on an uplink control channel to the base station. Downlink control information can support associated downlink data transmissions. For instance, downlink control information can include scheduling assignments, information that facilitates demodulation and decode of downlink data transmissions, and the like. In addition, downlink control information can also include information that supports uplink transmissions. For example, downlink control information can include scheduling grants for resources on an uplink channel, hybrid automatic repeat request (ARQ) acknowledgments in response to uplink transmissions, and/or power control commands. Similarly, uplink control information can support uplink and/or downlink transmissions. For instance, uplink control information can include hybrid-ARQ acknowledgements associated with received downlink transmissions, reports on downlink channel conditions, scheduling requests, etc.

In Long Term Evolution (LTE), a physical uplink control channel (PUCCH) can be utilized to convey uplink control information. PUCCH is employed by a mobile device when the mobile device does not have a scheduling grant for resources on a physical uplink shared channel (PUSCH). A PUCCH resource consists of a single resource block, which can span 12 sub-carriers in the frequency dimension and 1 sub-frame in the time dimension. PUCCH employs frequency division multiplexing (FDM) between resource blocks and code division multiplexing (CDM) within a resource block. The combined FDM/CDM approach enables a plurality of mobile devices to employ a single PUCCH resource to transmit uplink control information to a base station.

As multiple mobile devices can utilize the same resources, the base station implements separation algorithms to isolate uplink control information from individual mobile devices. Conventionally, the base station employs a per-mobile device approach to separate users on the PUCCH resource. For instance, the base station executes an isolation technique multiple times depending on a number of mobile devices included in the uplink control channel. Such iteration and/or duplication of processing can lead to high-complexity receivers.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating unified, low-complexity processing (e.g., user separation and noise estimation) of a control channel. One or more UEs can respectively transmit control signals, which are multiplexed on a control channel and a base station can receive a control channel signal that includes one or more control signals. The base station, in a single pass, can separate the control signals by matching the control channel signal with a base sequence and translating the matched signal to a time-domain representation. In the time-domain representation, each control signal resides at a different tap. Further, the base station can identify taps in the time-domain representation corresponding to an unused cyclic shift or orthogonal cover sequence. Such taps can be employed to generate a noise and/or interference estimate.

According to a first aspect, a method is described herein that can include receiving a control channel signal on a control channel. The control channel signal may include one or more signals from one or more UEs. Further, the method can include matching the control channel signal with a base sequence to generate a matched signal from the control channel signal. The method can further comprise translating the matched signal to a time-domain representation. In addition, the method can include identifying a set of tap locations in the time-domain representation which correspond to a signal associated with a UE.

Another aspect relates to a wireless communications apparatus. The wireless communications apparatus can include a memory that retains instructions related to receiving a control channel signal on a control channel and matching the control channel signal with a base sequence to generate a matched signal from the control channel signal. The control channel signal may include one or more signals from one or more UEs. The memory further retains instructions related to translating the matched signal to a time-domain representation, and identifying a set of tap locations in the time-domain representation which correspond to a signal associated with a UE. The wireless communications apparatus can further include a processor, coupled to the memory, configured to execute the instructions retained in the memory.

Yet another aspect relates to an apparatus that enables separation of users on a control channel in a single pass. The apparatus can include means for receiving a control channel signal on the control channel. The control channel signal may include one or more signals from one or more UEs. The apparatus can also include means for matching the control channel signal with a base sequence to generate a matched signal from the control channel signal. Further, the apparatus can comprise means for translating the matched signal to a time-domain representation. In addition, the apparatus can include means for identifying a set of tap locations in the time-domain representation which correspond to a signal associated with the UE. In a related aspect, the apparatus can optionally include means for determining tap locations associated with an index of the cyclic shift version, means for applying an orthogonal cover sequence on the two or more signals to separate the two or more signals, and/or means for demodulating the signal included in the set of tap locations to obtain control information.

Still another aspect relates to a computer program product that can comprise a computer-readable medium. The computer-readable medium can include code for receiving a control channel signal on a control channel, code for matching the control channel signal with a base sequence to generate a matched signal from the control channel signal, code for translating the matched signal to a time-domain representation, and code for identifying a set of tap locations in the time-domain representation which correspond to a signal associated with the UE.

In accordance with another aspect, an apparatus is described. The apparatus can include a processor configured to receive a control channel signal on a control channel, match the control channel signal with a base sequence to generate a matched signal from the control channel signal, translate the matched signal to a time-domain representation, and identify a set of tap locations in the time-domain representation which correspond to a signal associated with the UE. The control channel signal may include one or more signals from one or more UEs. In addition, the processor can be further configured to match the control channel signal and translate the matched signal, for all UEs of the plurality of UEs, in a single pass.

According to other aspects, a method is described that can include receiving a control channel signal on a control channel and generating a time-domain representation of the control channel in which one or more signals in the control channel are separated in time. In addition, the method can include identifying a tap, in the time-domain representation, that corresponds to an unused cyclic shift index, and estimating noise associated with the control channel signal based at least in part on the tap.

Another aspect relates to a wireless communications apparatus comprising a memory. The memory retains instructions related to receiving a control channel signal on a control channel, generating a time-domain representation of the control channel in which one or more signals in the control channel are separated in time, identifying a tap, in the time-domain representation, that corresponds to an unused cyclic shift index, and estimating noise associated with the control channel signal based at least in part on the tap. The wireless communications apparatus can also include a processor, coupled to the memory, configured to execute the instructions retained in the memory.

Yet another aspect relates to an apparatus that can include means for receiving a control channel signal on a control channel. The control channel signal may include one or more signals from one or more UEs The apparatus can also include means for generating a time-domain representation of the control channel in which one or more signals are separated in time. Further, the apparatus can include means for identifying a tap, in the time-domain representation, that corresponds to an unused cyclic shift index. In addition, the apparatus can include means for estimating noise associated with the control channel signal based at least in part on the tap.

Still another aspect relates to a computer program product that can comprise a computer-readable medium. The computer-readable medium can include code for receiving a control channel signal on a control channel, the control channel signal including one or more signals from one or more UEs, code for generating a time-domain representation of the control channel in which the one or more signals are separated in time, code for identifying a tap, in the time-domain representation, that corresponds to an unused cyclic shift index, and code for estimating noise associated with the control channel signal based at least in part on the tap.

In accordance with another aspect, an apparatus is described. The apparatus can include a processor configured to receive a control channel signal on a control channel, the control channel signal including one or more signals from one or more UEs, generate a time-domain representation of the control channel in which signals are separated in time, identify a tap, in the time-domain representation, that corresponds to an unused cyclic shift index, and estimate noise associated with the control channel signal based at least in part on the tap.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
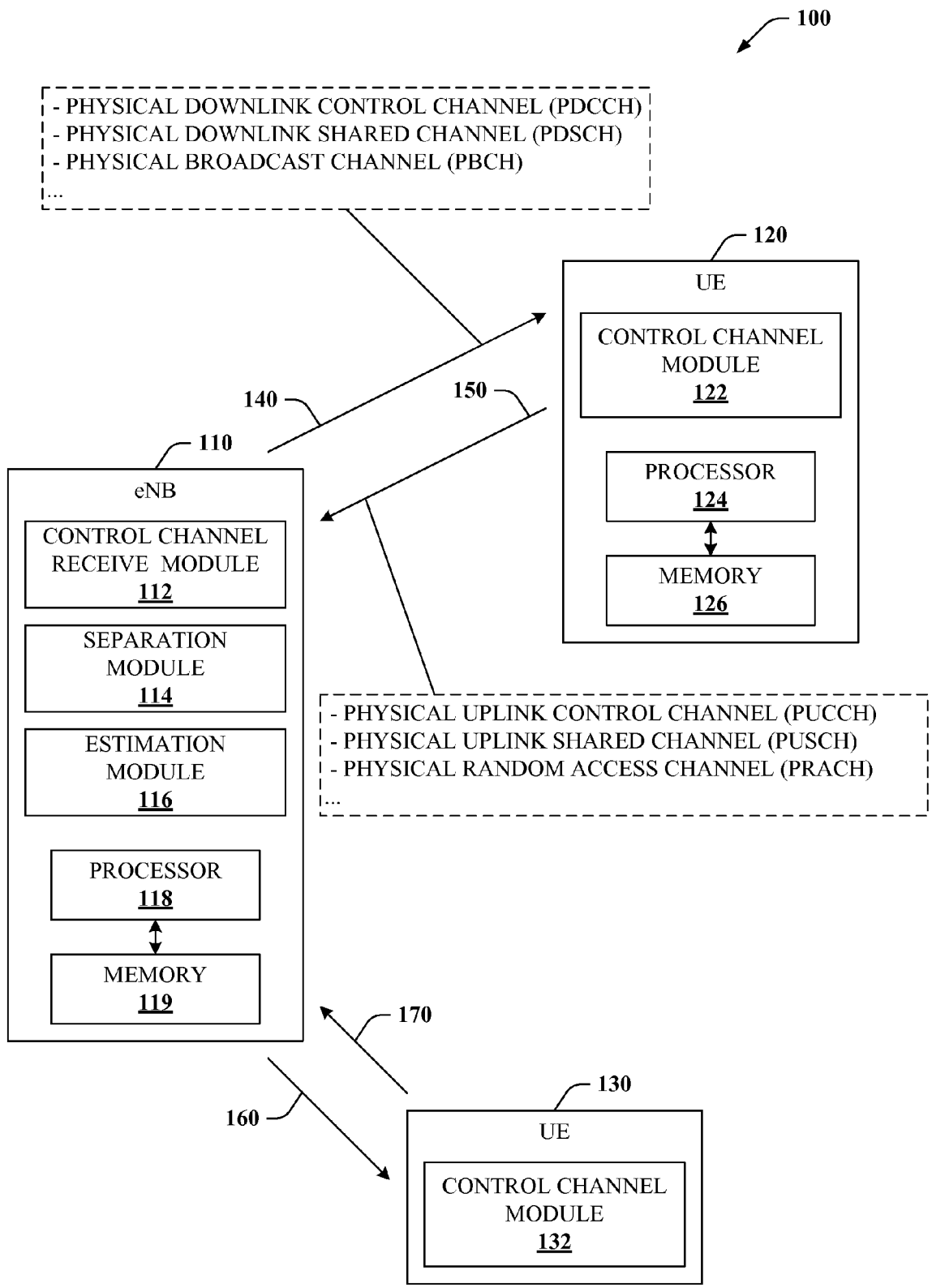
FIG. 1 illustrates an example wireless communication system that facilitates a low-complexity, unified approach to processing an uplink control channel in accordance with various aspects.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to computer-related entities such as: hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as, in accordance with a signal, having one or more data packets (e.g., data from one component interacting with another component in a local system, distributed system, and/or across a network such as the Internet with other systems by way of the signal).

Furthermore, various aspects are described herein in connection with a wireless terminal and/or a base station. A wireless terminal can refer to a device providing voice and/or data connectivity to a user. A wireless terminal can be connected to a computing device such as a laptop computer or desktop computer, or it can be a self contained device such as a personal digital assistant (PDA). A wireless terminal can also be called a system, a subscriber unit, a subscriber station, mobile station, mobile, remote station, access point, remote terminal, access terminal, user terminal, user agent, user device, or user equipment (UE). A wireless terminal can be a subscriber station, wireless device, cellular telephone, PCS telephone, cordless telephone, a Session Initiation Protocol (SIP) phone, a wireless local loop (WLL) station, a personal digital assistant (PDA), a handheld device having wireless connection capability, or other processing device connected to a wireless modem. A base station (e.g., access point, Node B, or evolved Node B (eNB)) can refer to a device in an access network that communicates over the air-interface, through one or more sectors, with wireless terminals. The base station can act as a router between the wireless terminal and the rest of the access network, which can include an Internet Protocol (IP) network, by converting received air-interface frames to IP packets. The base station also coordinates management of attributes for the air interface.

Moreover, various functions described herein can be implemented in hardware, software, firmware, or any combination thereof. If implemented in software, the functions can be stored on or transmitted over as one or more instructions or code on a computer-readable medium. Computer-readable media includes both computer storage media and communication media including any medium that facilitates transfer of a computer program from one place to another. A storage media can be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc (BD), where disks usually reproduce data magnetically and discs reproduce data optically with lasers. Combinations of the above should also be included within the scope of computer-readable media.

Various techniques described herein can be used for various wireless communication systems, such as Code Division Multiple Access (CDMA) systems, Time Division Multiple Access (TDMA) systems, Frequency Division Multiple Access (FDMA) systems, Orthogonal Frequency Division Multiple Access (OFDMA) systems, Single Carrier FDMA (SC-FDMA) systems, and other such systems. The terms "system" and "network" are often used herein interchangeably. A CDMA system can implement a radio technology such as Universal Terrestrial Radio Access (UTRA), CDMA2000, High Speed Packet Access (HSPA), High Speed Downlink Packet Access (HSDPA), High Speed Uplink Packet Access (HSUPA), etc. UTRA includes Wideband-CDMA (W-CDMA) and other variants of CDMA. Additionally, CDMA2000 covers the IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) is an upcoming release that uses E-UTRA, which employs OFDMA on the downlink and SC-FDMA on the uplink. HSPA, HSDPA, HSUPA, UTRA, E-UTRA, UMTS, LTE, LTE-A, SAE, EPC, and GSM are described in documents from an organization named "3rd Generation Partnership Project" (3GPP). Further, CDMA2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques. For clarity, terminology associated with WCDMA, HSPA, HSDPA, and HSUPA are employed in description below. However, it is to be appreciated that the claims appended hereto are not intended to be limited to WCDMA, HSPA, HSDPA, and HSUPA, unless explicitly done so.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects will be presented in terms of systems that can include a number of devices, components, modules, and the like. It is to be understood and appreciated that the various systems can include additional devices, components, modules, etc. and/or not include all of the devices, components, modules etc. discussed in connection with the figures. A combination of these approaches can also be used.

Referring now to the drawings, FIG. 1 illustrates an example wireless communication system 100 that facilitates a low-complexity, unified approach to processing an uplink control channel in accordance with various aspects. Wireless communication system 100 includes a base station or eNodeB (eNB) 110, user equipment (UE) 120, and UE 130 that communicate with one another over a wireless link. For instance, eNB 110 can transmit information to UE 120 over a downlink 140 and UE 120 can transmit information to eNB 110 via an uplink 150. Similarly, UE 130 can transmit information to eNB 110 via an uplink 170 and receive information from eNB 110 over a downlink 160. Downlinks 140 and 160 can include a plurality of channels such as, but not limited to, a physical downlink control channel (PDCCH), a physical downlink shared channel (PDSCH), a physical broadcast channel (PBCH), etc. In addition, uplinks 150 and 170 can include a plurality of uplink channels such as a physical uplink control channel (PUCCH), a physical uplink shared channel (PUSCH), a physical random access channel (PRACH), etc.

In one example, eNB 110 can be an access point, such as a macrocell access point, femtocell or picocell access point, a NodeB, an eNodeB, a base station, a mobile base station, a portion thereof, and/or substantially any device or apparatus that provides access for UEs to a wireless communication network. While only two UEs (e.g., UEs 120 and 130) and one eNB 110 are illustrated in FIG. 1, it should be appreciated that system 100 can include any number of UEs and/or eNBs. Further, it should be appreciated that system 100 can operate in a 3GPP LTE or LTE-A wireless network, a WCDMA wireless network, an OFDMA wireless network, a CDMA network, a 3GPP2 CDMA2000 network, an EV-DO network, a WiMAX network, a HSPA network, etc.

In an aspect, UEs 120 and 130 respectively include a control channel module 122 and a control channel module 132. The control channel modules 122 and 132 can generate, encode, and/or modulate uplink control information onto a control channel, such as PUCCH. The uplink control information can include hybrid-ARQ information (e.g., acknowledgement (ACK) and/or non-acknowledgement (NACK) information), channel quality indicator (CQI) information, and/or scheduling requests. A set of uplink resources, which include one or more resource blocks, are assigned for uplink control information on PUCCH. A resource block, in one example, can span 12 sub-carriers and extend for one slot. Typically, the one or more resource blocks are located at the edges of a total available bandwidth available to system 100. In one example, system 100 can implement frequency hopping at a slot boundary. For instance, a PUCCH transmission in a sub-frame can comprise a first resource block at or near an edge of the system bandwidth in a first slot of the sub-frame and, in a second slot of the sub-frame, the PUCCH transmission comprises a second resource block at or near an opposite edge of the system bandwidth. Collectively, the first and second resource blocks establish a PUCCH region. System 100 can include one or more PUCCH regions (e.g., one or more pairs of disparate PUCCH resource blocks).

UEs 120 and 130 can simultaneously utilize the assigned PUCCH resources (e.g., the one or more PUCCH regions) to transmit uplink control information. In one aspect, UE 120 and 130 can be separated utilizing frequency division multiplexing (FDM) techniques. For instance, UE 120 and UE 130 can be respectively configured to employ disparate PUCCH regions and, thus, different resource blocks located at different frequency locations. In another aspect, UE 120 and 130 can be separated utilizing code division multiplexing (CDM) techniques. For example, UE 120 and 130 can transmit uplink control information within the same PUCCH region through utilization of different cyclic shifts of a base sequence and/or different orthogonal block spreading codes as described in more detail infra.

UEs 120 and 130 can be assigned respective PUCCH regions, which can be different regions or identical regions. In addition, UEs 120 and 130 can be assigned respective shift indices corresponding to particular cyclic shifts of a base sequence. Further, depending on the uplink control information transmitted, eNB 110 can assign respective orthogonal cover sequences to UEs 120 and 130. The orthogonal cover sequence can provide time-domain spreading of symbols to enable multiple UEs to utilize identical shifts of the base sequence.

Control channel modules 122 and 132 of UEs 120 and 130, respectively, can utilize the assigned PUCCH regions, shift indices, and/or cover sequences to incorporate uplink control information into a control channel transmitted to eNB 110. In an aspect, UEs 120 and 130 can transmit uplink control information in the same resource block within the same sub-frame. eNB 110, to recover the uplink control information, separates each user. eNB 110 can include a control channel receive module 112 that receives a control channel signal associated with a resource block. The control channel signal can include uplink control information transmitted by a plurality of UEs, including UEs 120 and 130. The control channel receive module 112 can provide the received control channel signal to a separation module 114, which separates each user (e.g., UE 120, UE 130, and/or any other UEs (not shown)) in the received signal.

In one example, separation module 114 can utilize a match filter. For instance, separation module 114 can employ a match filter to filter the received signal with one user's assigned sequence (e.g., a shift of the base sequence). Remaining users can be averaged and filtered out. Under this approach, a match filter is needed for each user in the received signal. In another example, after sequence matching with a target user's sequence, an inverse discrete Fourier transform (IDFT) can be applied to translate the received signal to the time-domain. The target user's signal typically resides in a first few taps, while other users reside in later taps. Truncation (e.g., removing later taps from the received signal) removes interference and results in a time-domain representation of the target user's signal. A discrete Fourier transform (DFT) is applied to obtain a corresponding frequency-domain representation of the target user's signal. Under this approach, a total of M sequence-matchings, M DFTs, and M IDFTs are implemented, where M is a number of users in the received signal.

According to an aspect, separation module 114 can separate individual user signals from the received signal in a single pass. In particular, separation module 114 can obtain individual user signals from the received signal with a single sequence matching step and a single IDFT.

In an example, let $f_0[l]$, $l=0, \ldots, K-1$ be a base sequence, $f_1[(l+i)\%K]$, $l=0, \ldots, K-1$ is a cyclic shift version of the base sequence, and $F_0[k]$ and $F_1[k]$, $k=0, \ldots, K-1$ represent respective DFT versions of the base sequence and shifted version. According to this example, l and k represent tap and tone indices, respectively, to elements of the sequences and can range from 0 to K-1, where K represents a length of the base sequence and is an integer greater than or equal to 1. In addition, i represents a cyclic shift index corresponding to a particular shift of the base sequence. Continuing the example, a property of the cyclic shift sequence provides that $F_1[k]=e^{2\pi i/K}F_0[k]$. Accordingly, for any $H[k]$, $k=0, \ldots K-1$ and corresponding IDFT $h[l]$, $l=0, \ldots, K-1$, the following holds:

$$IDFT\left(\frac{H[k]F_1[k]F_0^*[k]}{|F_0[k]|^2}\right) = IDFT(H[k]e^{2\pi i/K}) = h[(l-i)\% K],$$

$$l = 0, \ldots, K-1$$

In view of the above, a base sequence with different shift indices assigned to different users transmitting in the same resource block, results in signals from each user being mixed in the frequency domain. However, after matching a received signal to the base sequence, the signals associated with each user are separated in the time domain.

In an aspect, separation module 114 can utilize the properties described above to separate a plurality of user signals transmitted in a PUCCH resource block. In particular, UE 120, UE 130, and any other UE transmitting a signal in a PUCCH resource block can be assigned different cyclic shifts of a base sequence. eNB 110 receives a combined signal that incorporates individual signals from each UE. eNB 110 employs separation module 114 to perform a sequence matching on the received signal with the base sequence. After sequence matching, separation module 114 can perform an IDFT to generate a time domain representation, wherein signals from each UE are separated. Separation module 114 can identify a signal associated with a particular user (such as UE 120 and/or UE 130) based upon a cyclic shift index associated with the particular user. For example, in the time domain representation, the signal associated with the particular user are concentrated in a few taps of the time domain representation, wherein the few taps correspond to the cyclic shift index. Separation module 114 can identify tap locations associated with the particular user to acquire that user's signal.

Conventionally, when obtaining a signal of a target user, signals from other users are treated as interference and interference filtering is employed. Noise and interference estimation is performed through reconstruction of user signals (e.g., non-target user signals) multiplied with a channel estimate. The reconstructed user signals are removed from a received signal.

eNB 110 includes an estimation module 116 that generates channel estimates and/or noise/interference estimates. To generate a channel estimate on a PUCCH sub-frame conveying CQI, estimation module 116 reads out reference signal (e.g., pilot) symbols of each user in accordance with shift indices respectively associated with each user. For a PUCCH sub-frame conveying hybrid-ARQ information, additional time-domain despreading is employed prior to reading out pilot symbols. To generate a noise and interference estimate, estimation module 116 identifies unused shift indices and/or orthogonal cover sequences. Taps of the time-domain representation, corresponding to the unused shift indices or orthogonal cover sequences, automatically provide a noise and interference estimate. Accordingly, estimation module 116 collects the taps to compute variance and avoids computations associated with signal reconstruction and subtraction.

As further illustrated in system 100, eNB 110 can include a processor 118 and/or a memory 119, which can be utilized to implement some or all the functionality of control channel receive module 112, separation module 114, estimation module 116, and/or other functionality of eNB 110. In addition, UE 120 can include a processor 124 and a memory 126, which can be employed to implement some or all the functionality of control channel module 122 and/or other functionality of UE 120. Further, though not depicted in FIG. 1, UE 130 can include a processor and/or memory, similar to processor 124 and memory 126 of UE 120.

Figure 2:
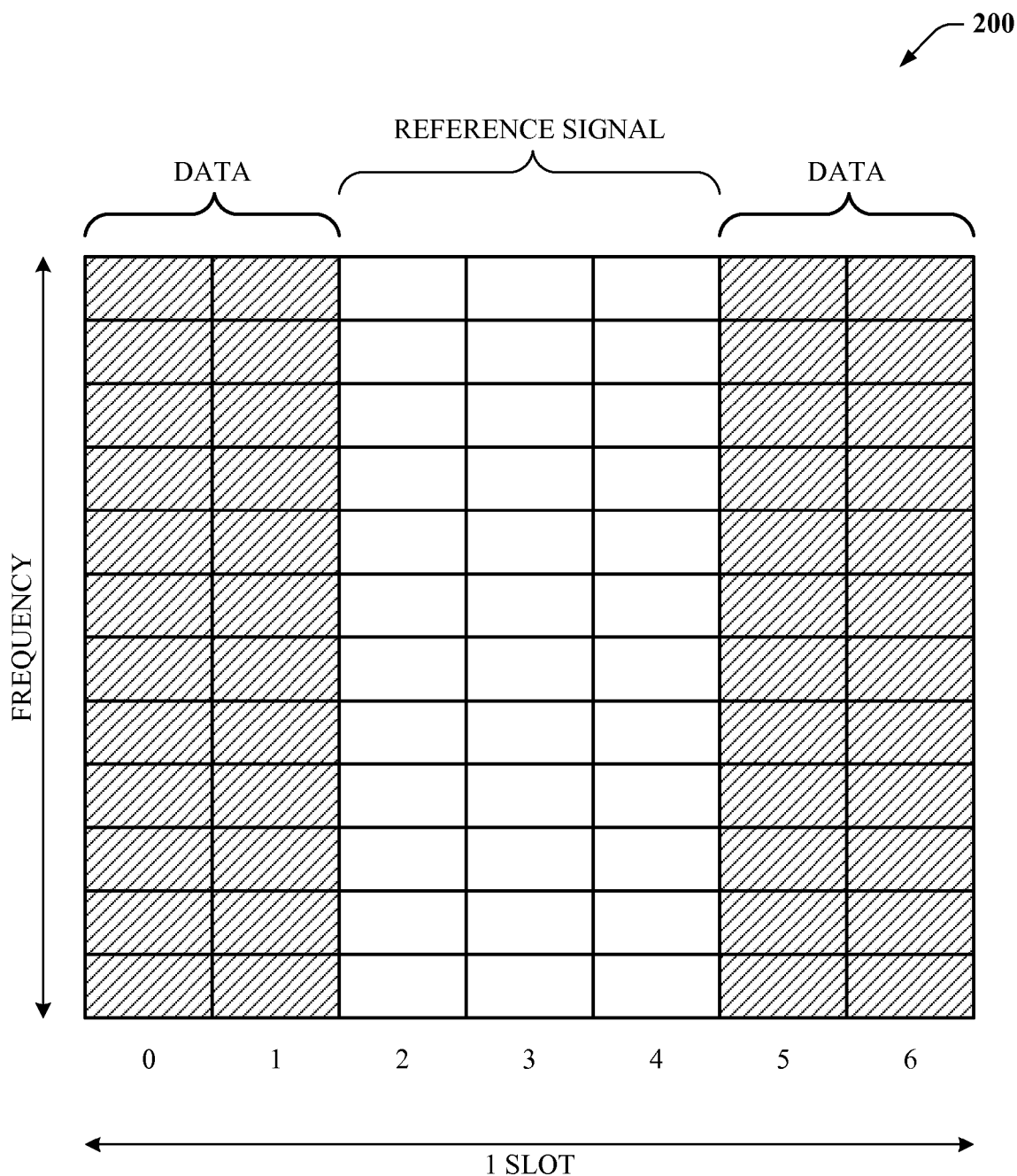
FIG. 2 is an illustration of an example resource structure for an uplink control channel that includes hybrid automatic repeat request information in accordance with various aspects.

Turning to FIG. 2, illustrated is an example resource structure 200 for an uplink control channel in accordance with an aspect. Resource structure 200 depicts a resource block spanning 12 sub-carriers in the frequency dimension and one slot in the time dimension. However, it is to be appreciated that resource blocks of varying sizes can be employed with aspects described herein and that claims appended hereto are not intended to be limited to the example resource block illustrated in FIG. 2. In addition, resource structure 200 is one example structure and it is to be appreciated that alternative structures can be utilized.

In an aspect, resource structure 200 can be utilized to transmit hybrid-ARQ information (e.g., ACK/NACK information) in a PUCCH region of uplink resources. Symbols 2, 3, and 4 of the resource block include reference signals while symbols 0, 1, 5, and 6 include data (e.g., ACK/NACK information). The reference signal symbols facilitate channel estimation as well as coherent demodulation of the data symbols.

Figure 3:
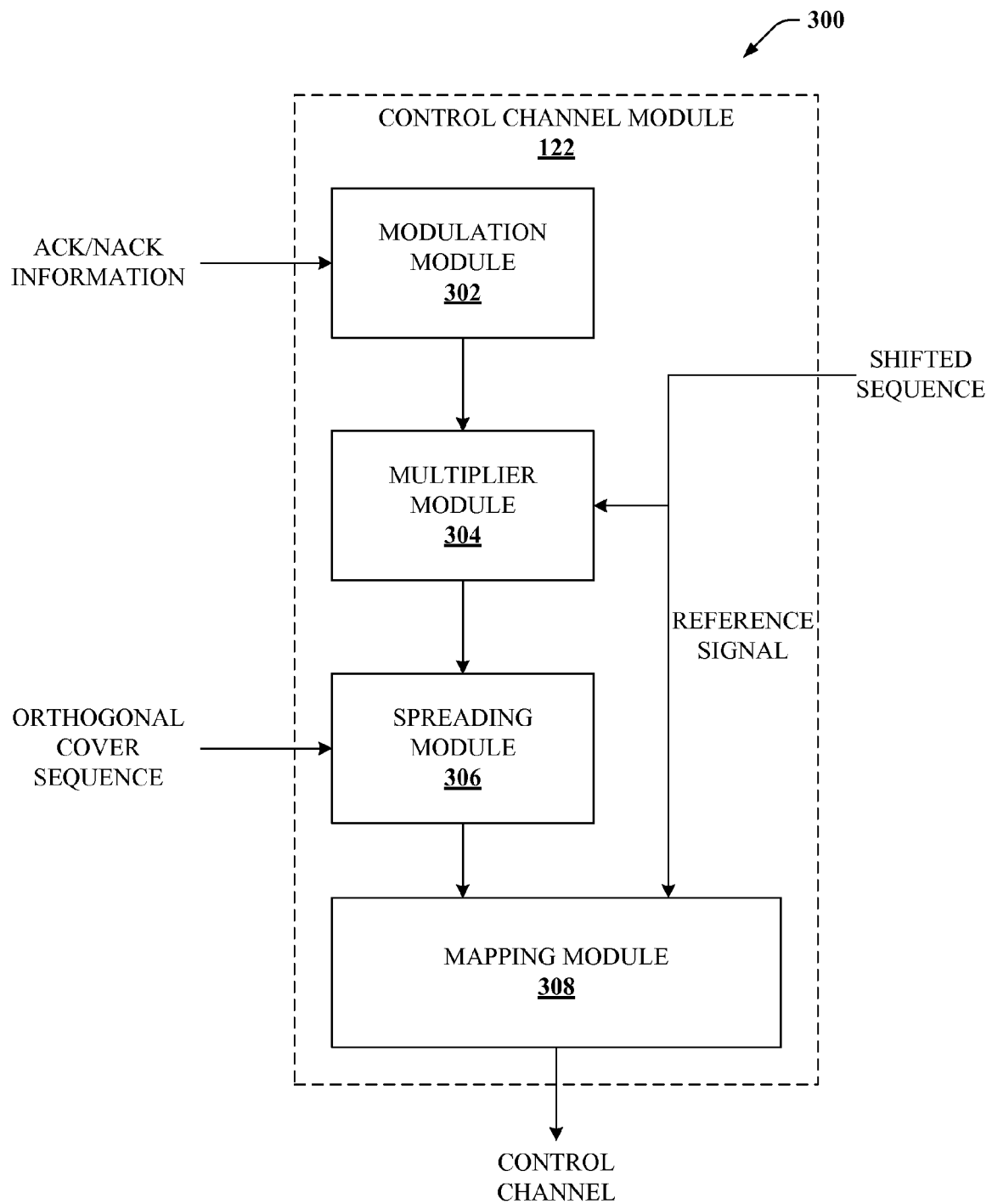
FIG. 3 is an illustration of an example system that facilitates incorporation of uplink control information into a control channel in accordance with various aspects.

Referring to FIG. 3, a system 300 is illustrated that facilitates incorporation of uplink control information into a control channel in accordance with various aspects. System 300 can include a control channel module 122 of UE 120, which can similar to and implement similar functionality as described above with reference to FIG. 1. In an aspect, control channel module 122 can be employed to incorporate hybrid-ARQ information into a control channel.

Control channel module 122 can include a modulation module 302 that encodes ACK/NACK information (e.g., hybrid-ARQ information) into a modulation symbol. In one example, ACK/NACK information can include one acknowledgement bit and modulation module 302 utilizes binary phase-shift keying (BPSK) modulation to convert the ACK/NACK information into a BPSK symbol. In another example, the ACK/NACK information can include more than one bit and modulation module 302 can employ quadrature phase-shift keying (QPSK) to generate a QPSK symbol from the ACK/NACK information.

A multiplier module 304 can modulate a shifted sequence with the modulation symbol generated by the modulation module 302. The shifted sequence can be a cyclic shift version of a cell-specific base sequence assigned to UE 120. In addition, control channel module 122 can utilize the shifted sequence as a reference signal, included in the control channel, to facilitate channel estimation, coherent demodulation, etc.

As hybrid-ARQ information typically comprises a few bits of information per UE, a resource block of the control channel generally has capacity for hybrid-ARQ information from more users than a number of supported cyclic shifts of the base sequence. To accommodate additional users in the resource block, each user can be assigned an orthogonal cover sequence or spreading code, such that users with the same shifted sequence are assigned different cover sequences. Spreading module 306 can utilize the orthogonal cover sequence to spread the modulated shifted sequence in the time-domain across OFDM symbols. After modulation, sequence multiplication, and spreading, the resultant signal can be mapped to a resource block of the control channel by mapping module 308. In addition, the mapping module 308 can incorporate the reference signal (e.g., a shifted sequence not modulated by data symbols) into the resource block.

Figure 4:
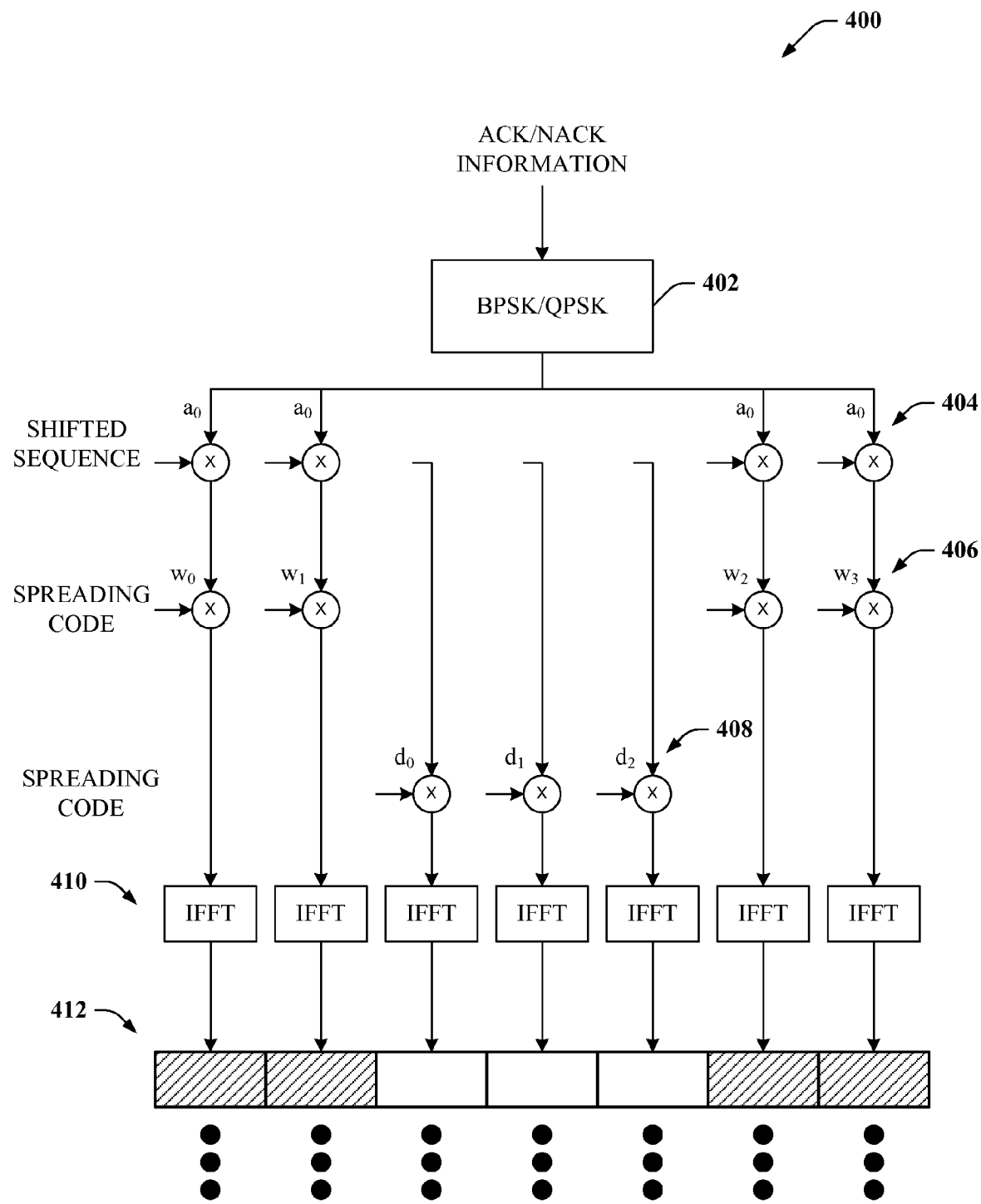
FIG. 4 is an illustration of an example data flow for generating a control channel from hybrid-ARQ information in accordance with various aspects.

Turning to FIG. 4, a data flow 400 is illustrated for generating a control channel from hybrid-ARQ information in accordance with various aspects. In one example, the generated control channel conforms to structure 200 described with reference to FIG. 2; however, it is to be appreciated that alternative resource structures can be employed. Further, control channel module 122 can implement data flow 400 to generate the control channel.

In an aspect, data flow 400 can commence with ACK/NACK information. ACK/NACK information can include 1 or 2 bits of information that indicate acknowledgement or non-acknowledgement of a downlink transport block. A modulator 402 converts the ACK/NACK information into a modulation symbol, $a_0$. In one example, modulator 402 can employ BPSK to generate the modulation symbol when the ACK/NACK information includes 1 bit and employ QPSK to generate the modulation symbol when the ACK/NACK information includes two or more bits. As shown in data flow 400, the modulation symbol can be conveyed on multiple symbols of the resource block of the control channel. In accordance with structure 200, the modulation symbol, $a_0$, is conveyed on symbols 0, 1, 5, and 6 of the resource block. Accordingly, multiple and parallel processing of the modulation symbol occurs to generate the control channel.

At 404, a shifted sequence is multiplied (e.g., modulated) by the modulation symbol. The shifted sequence can be a cyclic shift of a base sequence. In one example, the shifted sequence can have a length corresponding to a number of sub-carriers in the resource block of the control channel. For instance, given a resource block spanning 12 sub-carriers, the shifted sequence can be a length-12 sequence. As shown in FIG. 4, modulation of the shifted sequence can be performed multiple times, in parallel, to enable the ACK/NACK information to be included in multiple symbols of the resource block.

At 406, the modulated shifted sequence is further multiplied by a spreading code. In one example, the spreading code can be a length-4 orthogonal cover sequence; however, it is to be appreciated that the spreading code can comprise sequences of varying sizes comparable to a number of data symbols in the resource block. Moreover, the spreading code can be a Walsh code or other similar orthogonal cover sequence. At 408, a reference signal is generated by multiplication (modulation) of the shifted sequence by a spreading code. The spreading code can be a length-3 orthogonal cover sequence such as a DFT sequence. It is to be appreciated that sequences with different lengths can be employed. At 410, each symbol passes through an inverse fast Fourier transform and is incorporated in the resource block of the control channel as shown at 412.

Figure 5:
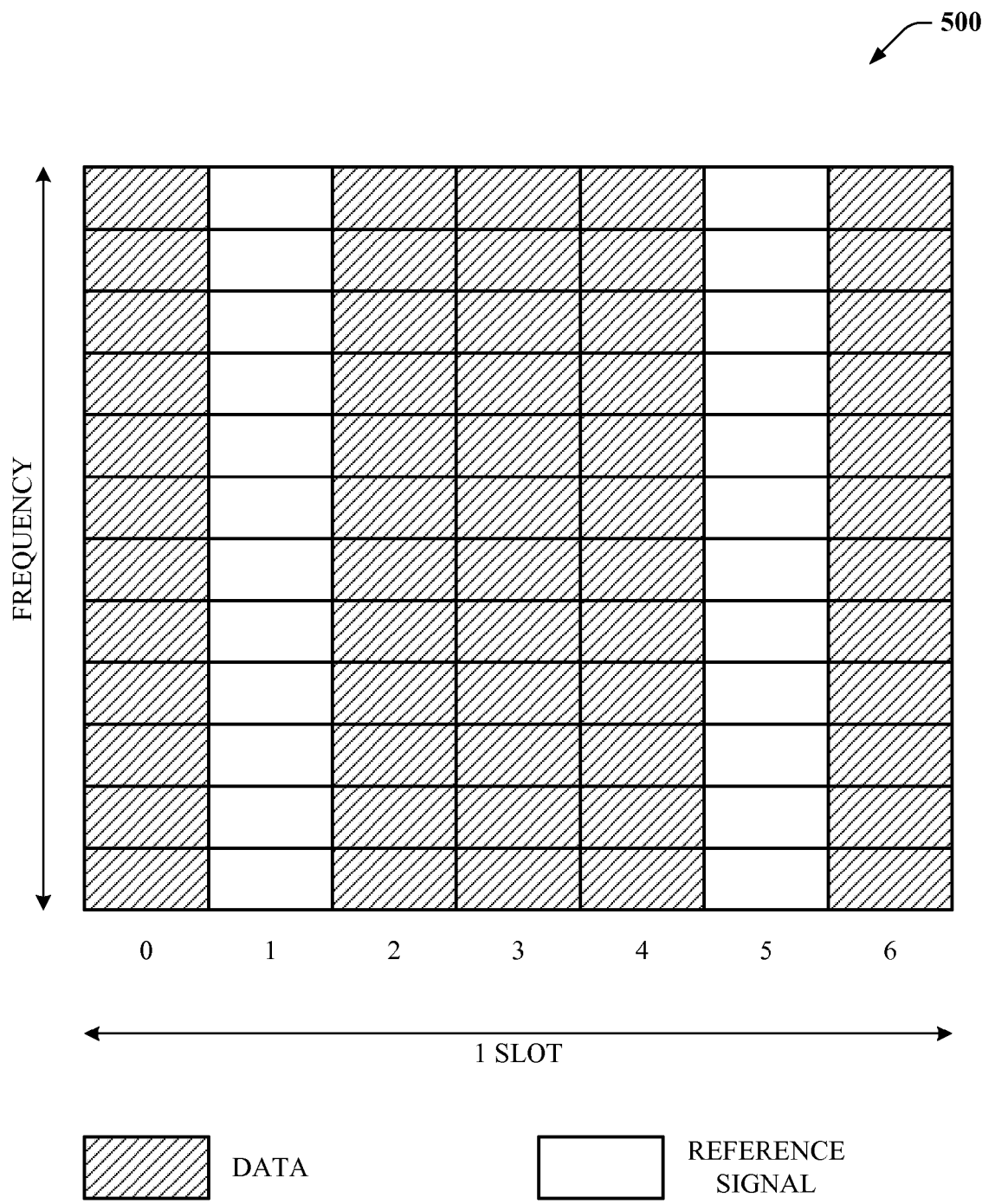
FIG. 5 is an illustration of an example resource structure for an uplink control channel that includes channel quality indicator information in accordance with various aspects.

Turning to FIG. 5, illustrated is an example resource structure 500 for an uplink control channel in accordance with an aspect. Resource structure 500 depicts a resource block spanning 12 sub-carriers in the frequency dimension and one slot in the time dimension. However, it is to be appreciated that resource blocks of varying sizes can be employed with aspects described herein and that claims appended hereto are not intended to be limited to the example resource block illustrated in FIG. 5. In addition, resource structure 500 is one example structure and it is to be appreciated that alternative structures can be utilized.

In an aspect, resource structure 500 can be utilized to transmit CQI information in a PUCCH region of uplink resources. Symbols 1 and 5 of the resource block include reference signals while symbols 0, 2, 3, 4, and 6 include data (e.g., CQI information). The reference signal symbols facilitate channel estimation as well as coherent demodulation of the data symbols.

Figure 6:
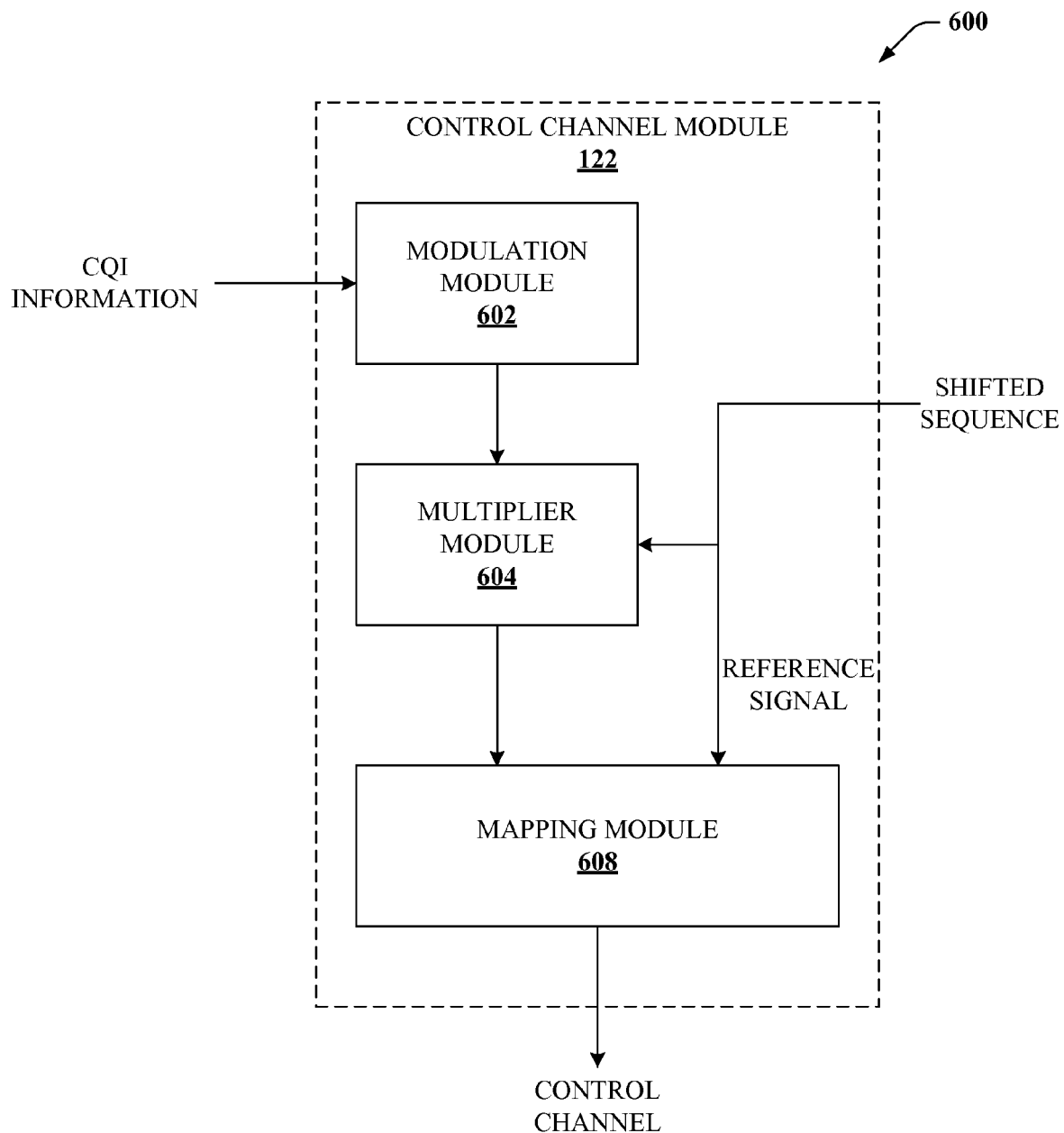
FIG. 6 is an illustration of an example system that facilitates incorporation of uplink control information into a control channel in accordance with various aspects.

Referring to FIG. 6, a system 600 is illustrated that facilitates incorporation of uplink control information into a control channel in accordance with various aspects. System 600 can include a control channel module 122 of UE 120, which can be similar to and implement similar functionality as described above with reference to FIG. 1. In addition, control channel module 122 can be employed to incorporate CQI information into a control channel.

Control channel module 122 can include a modulation module 602 that encodes CQI information into a plurality of modulation symbols. In one example, the CQI information can comprise a plurality of bits which are modulated to generate 10 modulation symbols. Modulation module 602 can utilize QPSK modulation to generate the CQI modulation symbols; however, it is to be appreciated that other modulation schemes can be employed. A multiplier module 604 can employ the CQI modulation symbols to modulate a shifted sequence. The shifted sequence can be a cyclic shift version of a cell-specific base sequence assigned to UE 120. In addition, control channel module 122 can utilize the shifted sequence as a reference signal, included in the control channel, to facilitate channel estimation, coherent demodulation, etc. Control channel module 122 further includes a mapping module 608, which can map the shifted sequence, modulated by CQI modulation symbols, and the reference signal to one or more resource blocks of a control channel. In one aspect, mapping module 608 can incorporate the modulated CQI information into the control channel in accordance with structure 500; however, it is to be appreciated that other channel structures can be employed.

Figure 7:
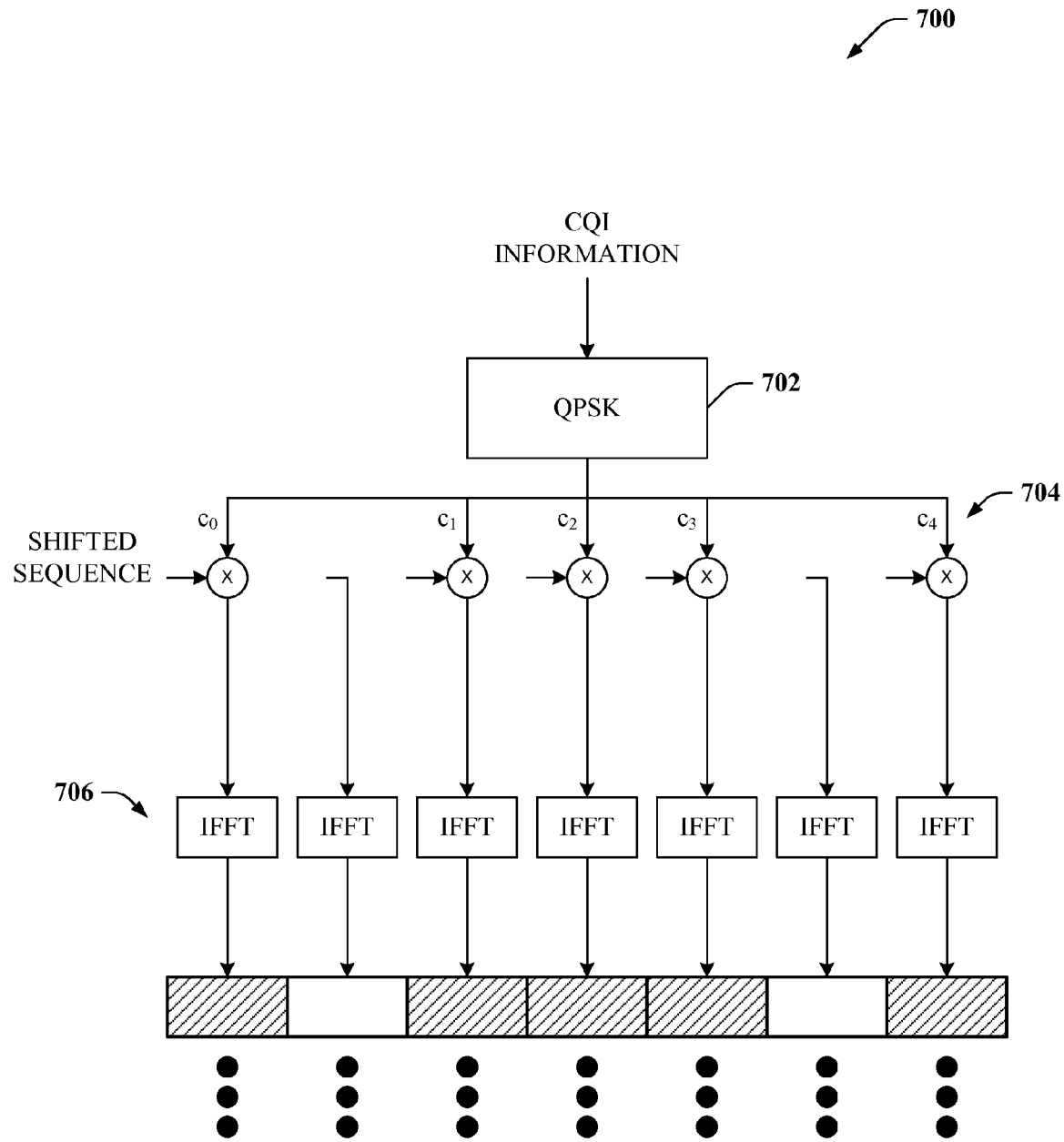
FIG. 7 is an illustration of an example data flow for generating a control channel from channel quality information in accordance with various aspects.

Turning to FIG. 7, a data flow 700 is illustrated for generating a control channel from channel quality information in accordance with various aspects. In one example, the generated control channel conforms to resource structure 500 described with reference to FIG. 5; however, it is to be appreciated that alternative resource structures can be employed and that the structure described herein is an example to facilitate explanation.

In an aspect, data flow 700 can commence with CQI information, which can include multiple bits of information. For example, the CQI information can include 10 bits of information encoded to produce 20 coded bits. A modulator 702 converts the CQI information into a plurality of modulation symbols. In one example, modulator 702 can employ QPSK to generate the plurality of modulation symbols. In the above example of 20 coded bits, modulator 702 can generate 10 modulation symbols.

In accordance with structure 500, each modulation symbol is conveyed on a separate OFDM symbol of the control channel. For the purpose of simplicity of explanation, data flow 700 depicts control channel processing associated with one slot or resource block of the control channel, which conveys five modulation symbols. The remaining five modulation symbols can be transmitted in a similar fashion in another slot or resource block of the control channel.

At 704, a shifted sequence is multiplied (e.g., modulated) by respective modulation symbols from the plurality of modulation symbols. The shifted sequence can be a cyclic shift of a base sequence. In one example, the shifted sequence can have a length corresponding to a number of sub-carriers in the resource block of the control channel. For instance, given a resource block spanning 12 sub-carriers, the shifted sequence can be a length-12 sequence. At 706, each modulated sequence, as well as unmodulated shifted sequences employed as reference signals, passes through an inverse fast Fourier transform. After the IFFT operation, the sequences are mapped to the resource block of the control channel.

Figure 8:
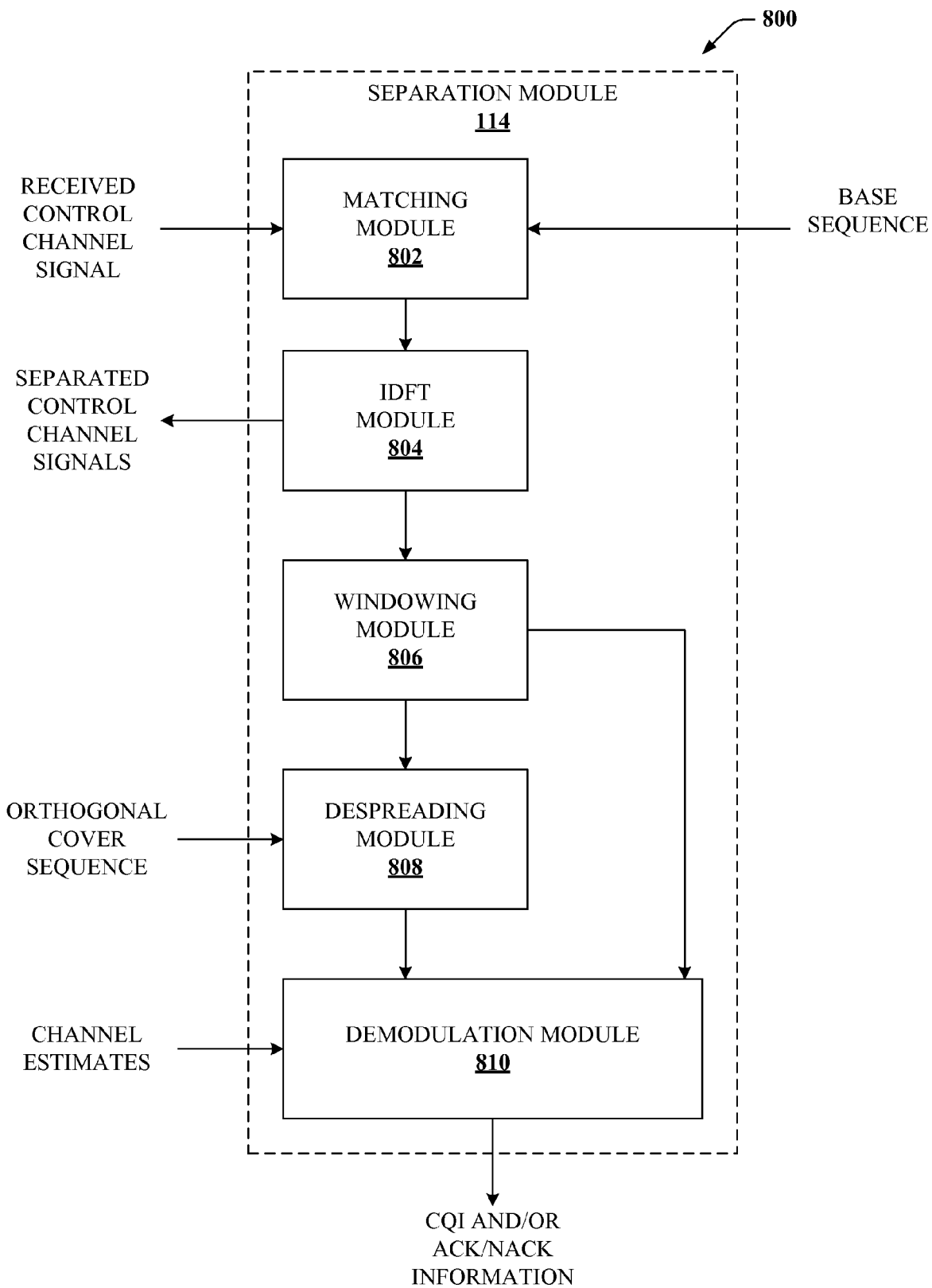
FIG. 8 is an illustration of an example system that facilitates separation of uplink control information from multiple users transmitted in a control channel in accordance with various aspects.

Turning now to FIG. 8, illustrated is a system 800 that facilitates separation of uplink control information from multiple users transmitted in a control channel in accordance with various aspects. System 800 can include separation module 114 of eNB 110 described above with respect to FIG. 1. Separation module 114 can receive a control channel signal that includes control channel signals from a plurality of UEs. Separation module 114 can include a matching module 802 that performs sequence matching on the received control channel signal relative to a base sequence. The base sequence can be cell-specific such that UEs served by eNB 110 utilize the base sequence and/or a cyclic shift of the base sequence when transmitting control information on the control channel to eNB 110. After sequence matching by matching module 802, separation module 114 can employ an IDFT module 804 which translates the matched signal to a time-domain representation.

Figure 9:
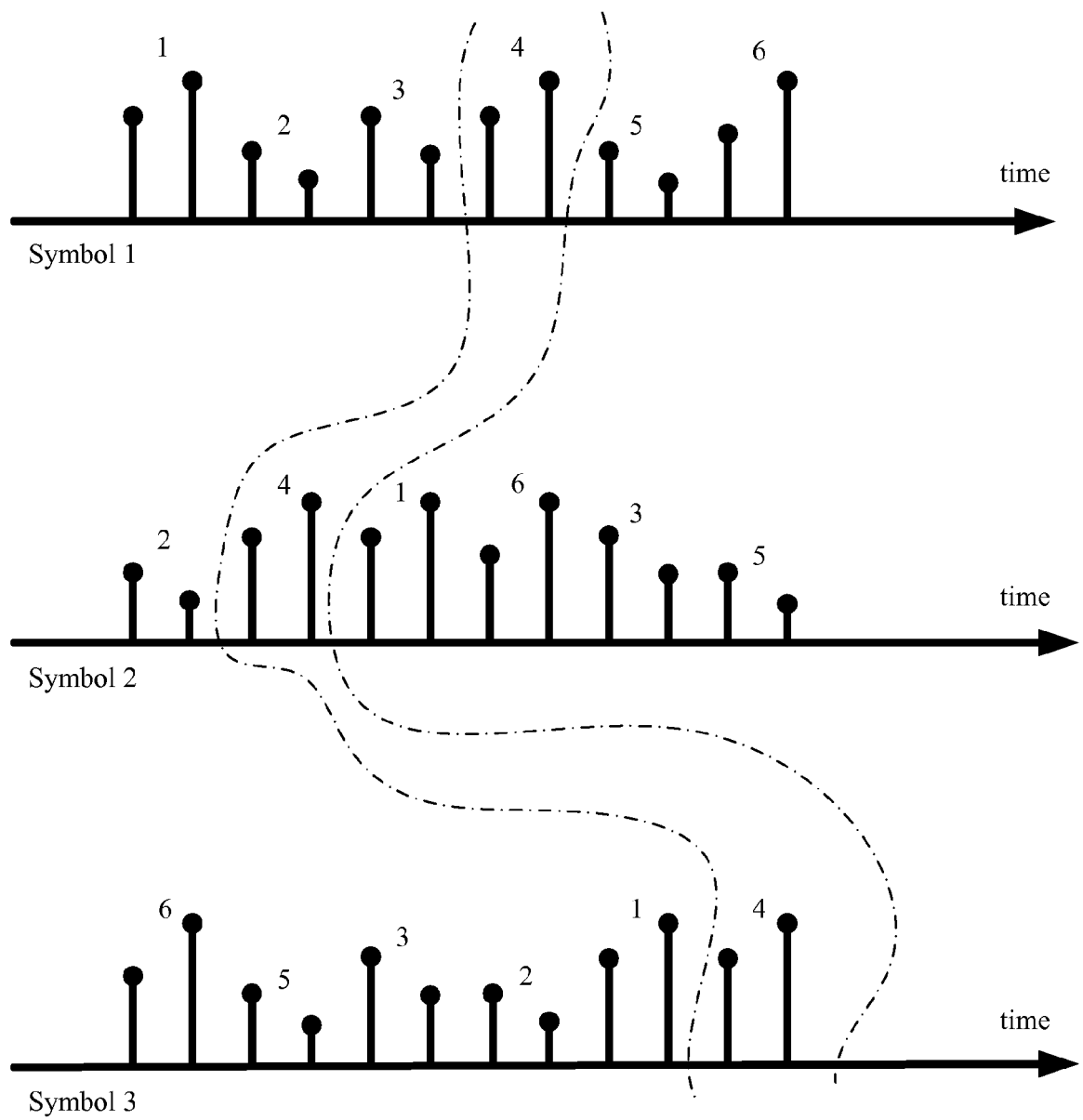
FIG. 9 is an illustration of a time-domain representation of symbols after sequence matching and inverse discrete Fourier transform in accordance with various aspects.

In an aspect, each UE transmitting a control signal on the control channel employs a different cyclic shift of the base sequence when generating respective control signals. After matching a received signal, which includes a plurality of control signals from a plurality of UEs, to the base sequence and translating the matched signal to the time-domain, each control signal from each UE is separated in the time domain. For example, FIG. 9 depicts three OFDM symbols in the time-domain after sequence matching with the base sequence. As shown in FIG. 9, data symbols from 6 example UEs are dispersed in time. The tap location, in time, for a given OFDM symbol, of a data symbol associated with a particular UE corresponds to a cyclic shift index utilized by the UE. For example, a UE utilizing a base sequence (e.g., cyclic shift index of zero), is located in a first few taps. In another example, a UE utilizing a middle cyclic shift index is located in middle taps. In addition, a UE employing a high cyclic shift index is located in later taps. In an aspect, symbol-level shift hopping can be employed by UEs on the control channel. With symbol-level shift hopping, a UE can employ different cyclic shift indices on different OFDM symbols. Accordingly, as shown in FIG. 9, tap locations for a particular UE can vary from symbol to symbol. In another example, without symbol-level shift hopping, tap locations for a particular UE will align from symbol to symbol.

Separation module 114 can employ a windowing module 806 to identify tap locations associated with a given UE in each symbol of the received control channel signal. In one example, for a given symbol, windowing module 806 can utilize a cyclic shift utilized by a UE for that symbol to identify a corresponding tap location. As shown in FIG. 9, tap locations for a UE can be collected for each symbol to generate a set of tap locations. Values associated with each tap location in the set of tap locations can be collected and demodulated by a demodulation module 810 to recover CQI and/or hybrid-ARQ information. For hybrid-ARQ information, the set of tap locations are provided, prior to demodulation, to despreading module 808 which separates control channel signals further based upon an orthogonal cover sequence applied by UEs to increase a capacity of the control channel. For CQI information, the set of tap locations can be directly provided to the demodulation module 810. Demodulation module 810 can employ channel estimates, noise estimates, and/or interference estimates to facilitate demodulation.

Figure 10:
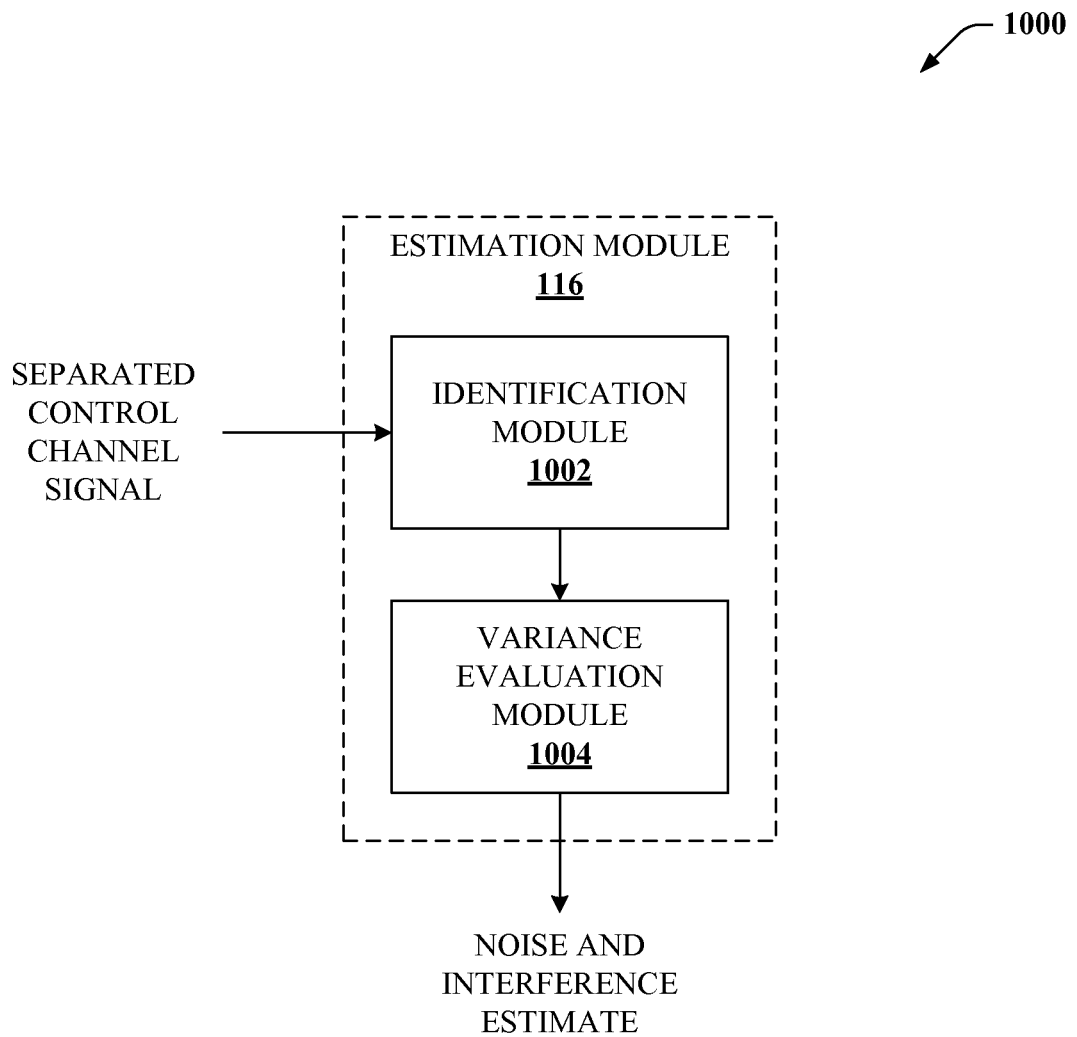
FIG. 10 is an illustration of an example system that facilitates interference and noise estimation in accordance with various aspects.

Turning to FIG. 10, a system 1000 that facilitates interference and noise estimation is illustrated. System 1000 can include estimation module 116 of eNB 110 described above with respect to FIG. 1. Estimation module 116 can receive a separated control channel signal that includes a plurality of control channel signals, from a plurality of UEs, separated in the time-domain. Estimation module 116 can utilize an identification module 1002 that determines whether any cyclic shifts and/or orthogonal cover sequences are unused by UEs. Identification module 1002 can collect corresponding tap locations into a set of unused taps and provide the set to a variance evaluation module 1004. The variance evaluation module 1004 can utilize the set of unused taps to generate a noise and interference estimate. In an aspect, tap locations corresponding to unused shifts and/or covers automatically provide a noise and interference estimate.

Figure 11:
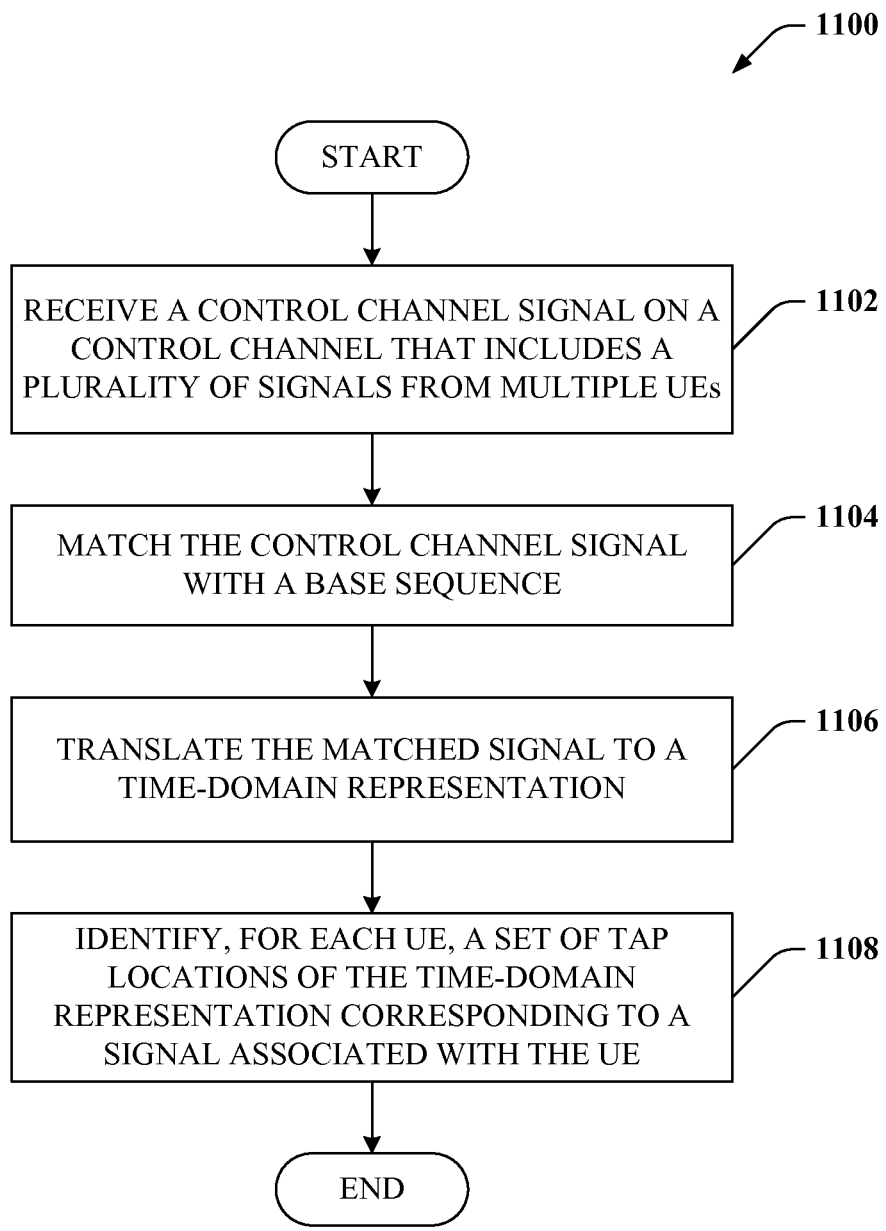
FIG. 11 is an illustration of an example methodology for separating a plurality of signals multiplexed within a control channel.
Figure 12:
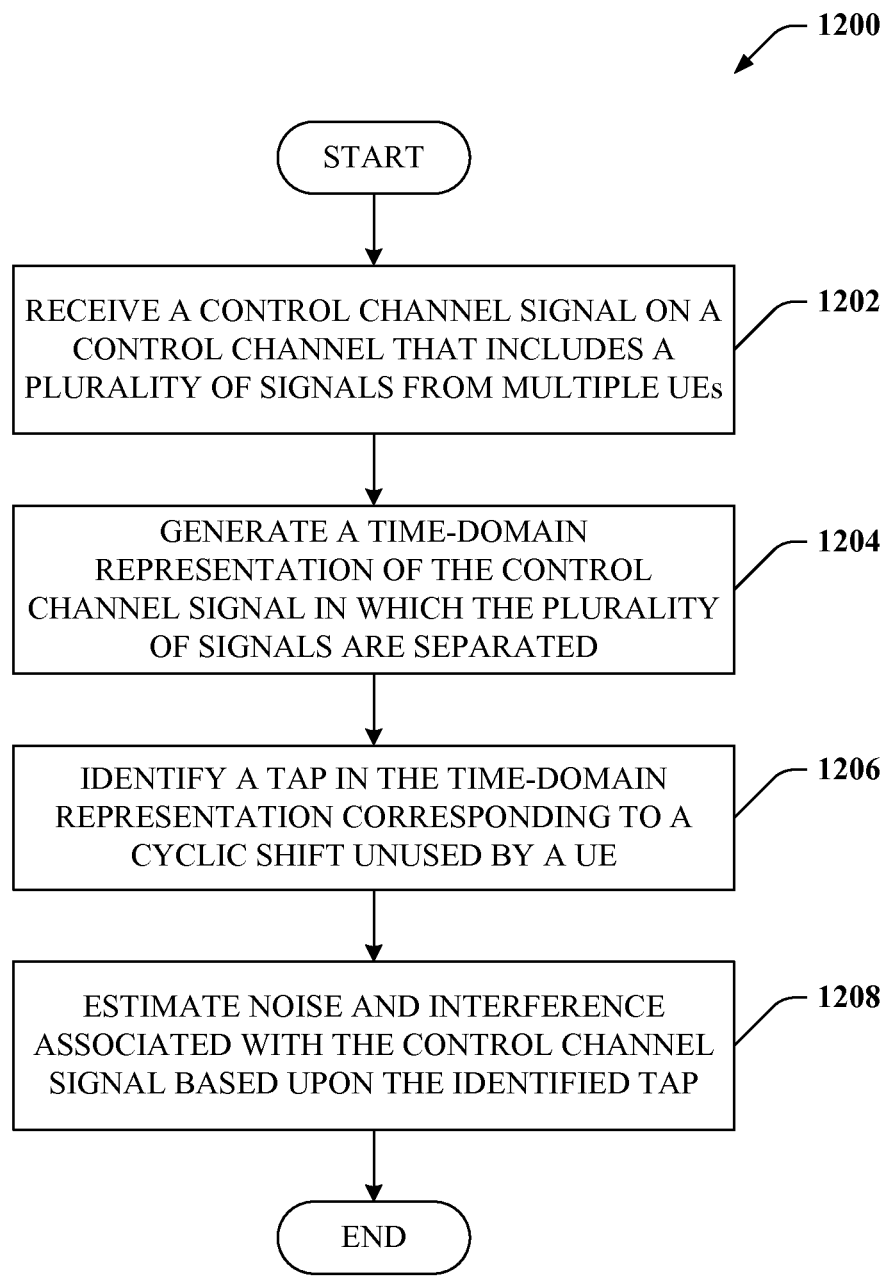
FIG. 12 is an illustration of an example methodology for estimating noise and interference associated with a control channel in accordance with various aspects.

Referring to FIGS. 11-12, methodologies are described related to facilitating unified user separation and noise estimation for an uplink control channel. The methodologies can be implemented by systems 100, 800, and/or 1000, described above. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more embodiments.

Turning to FIG. 11, illustrated is a method 1100 for separating a plurality of signals from a plurality of mobile devices multiplexed within a control channel. Method 1100 can be employed, for example, by a base station (e.g., eNB 110) to receive an uplink control channel. At reference numeral 1102, a control channel signal is received on a control channel. The control channel signal can include one or more resource blocks of the control channel. In addition, the control channel signal can include a plurality of signals from multiple UEs, which are multiplexed together in the control channel. At reference numeral 1104, the control channel signal can be matched with a base sequence. In an aspect, multiple UEs can respectively utilize different cyclic shifts of the base sequence to facilitate multiplexing on the control channel. At reference numeral 1106, the matched signal can be translated to a time-domain representation. The time-domain representation can be generated by applying an inverse discrete Fourier transform on the matched signal. In an example, matching the control channel signal and translating the matched signal occurs once among the multiple UEs.

In the time-domain representation, signals of the plurality of signals are separated such that each signal of the plurality of signals is located at different taps of the time-domain representation. When transmitting on the control channel, each UE can utilize a different cyclic shift version of the base sequence. In an aspect, a tap location of a signal can correspond to a cyclic shift index employed, by an associated UE, to transmit the signal. Accordingly, at reference numeral 1108, a set of tap locations of the time-domain representation are identified for each UE. In an example, identifying the set of tap locations can be effectuated by determining tap locations, of the time-domain representation, associated with an index of the cyclic shift version employed by the UE.

The set of tap locations identified for a UE correspond to a signal transmitted by the UE. Accordingly, control information conveyed therein can be recovered by demodulating the signal. In one aspect, the set of tap locations can include two or more signals associated with two or more UEs. For instance, multiple UEs can utilize identical cyclic shift versions of the base sequence in order to maximize a control channel capacity. In such instances, an orthogonal cover sequence can be applied on the two or more signals to further separate (e.g., despread) the signals.

Referring now to FIG. 12, a method 1200 for estimating noise and interference associated with a control channel is illustrated. Method 1200 can be employed, for example, by a base station (e.g., eNB 110) to receive an uplink control channel. At reference numeral 1202, a control channel signal is received on a control channel. The control channel signal can include one or more resource blocks of the control channel. In addition, the control channel signal can include a plurality of signals from multiple UEs, which are multiplexed together in the control channel. At reference numeral 1204, a time-domain representation of the control channel signal can be generated. The time-domain representation is generated such that the signals of the plurality of signals are separated in the time-domain. In an example, method 1100 can be utilized to generate the time-domain representation.

At reference numeral 1206, a tap, in the time-domain representation, which corresponds to an unused cyclic shift index, is identified. In an example, a tap corresponding to an unused shift automatically provides a noise and interference estimate. At 1208, noise and interference, associated with the control channel signal, is estimated based upon the identified tap.

It will be appreciated that, in accordance with one or more aspects described herein, inferences can be made regarding matching a signal to a base sequence, collecting tap locations associated with a particular UE, identifying unused cyclic shifts, and the like. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 13:
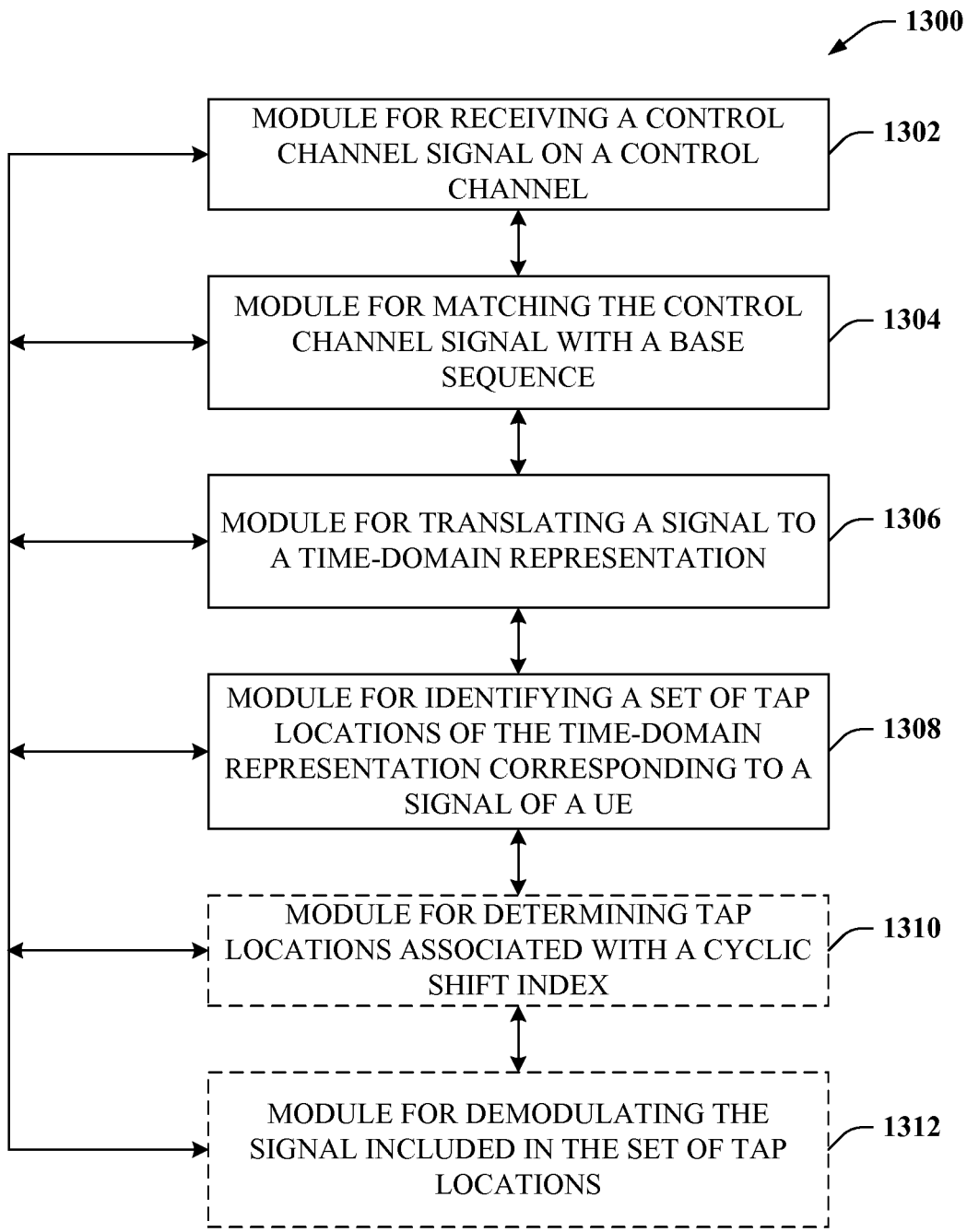
FIG. 13 is an illustration of an example apparatus that facilitates separation of user signals multiplexed on a control channel in accordance with various aspects.

Referring next to FIG. 13, an apparatus 1300 that facilitates separation of user signals multiplexed on a control channel is illustrated. It is to be appreciated that apparatus 1300 is represented as including functional blocks, which can be functional blocks that represent functions implemented by a processor, software, or combination thereof (e.g., firmware). Apparatus 1300 can be implemented by a base station (e.g., eNB 110) and/or any other suitable network entity. Apparatus 1300 can include a module 1302 for receiving a control channel signal on a control channel, a module 1304 for matching the control channel signal with a base sequence, a module 1306 for translating a signal to a time-domain representation, a module 1308 for identifying a set of tap locations of the time-domain representation corresponding to a signal of a UE. In addition, apparatus 1300 can include an optional module 1310 for determining tap locations associated with a cyclic shift index, and an optional module 1312 for demodulating the signal included in the set of tap locations.

Figure 14:
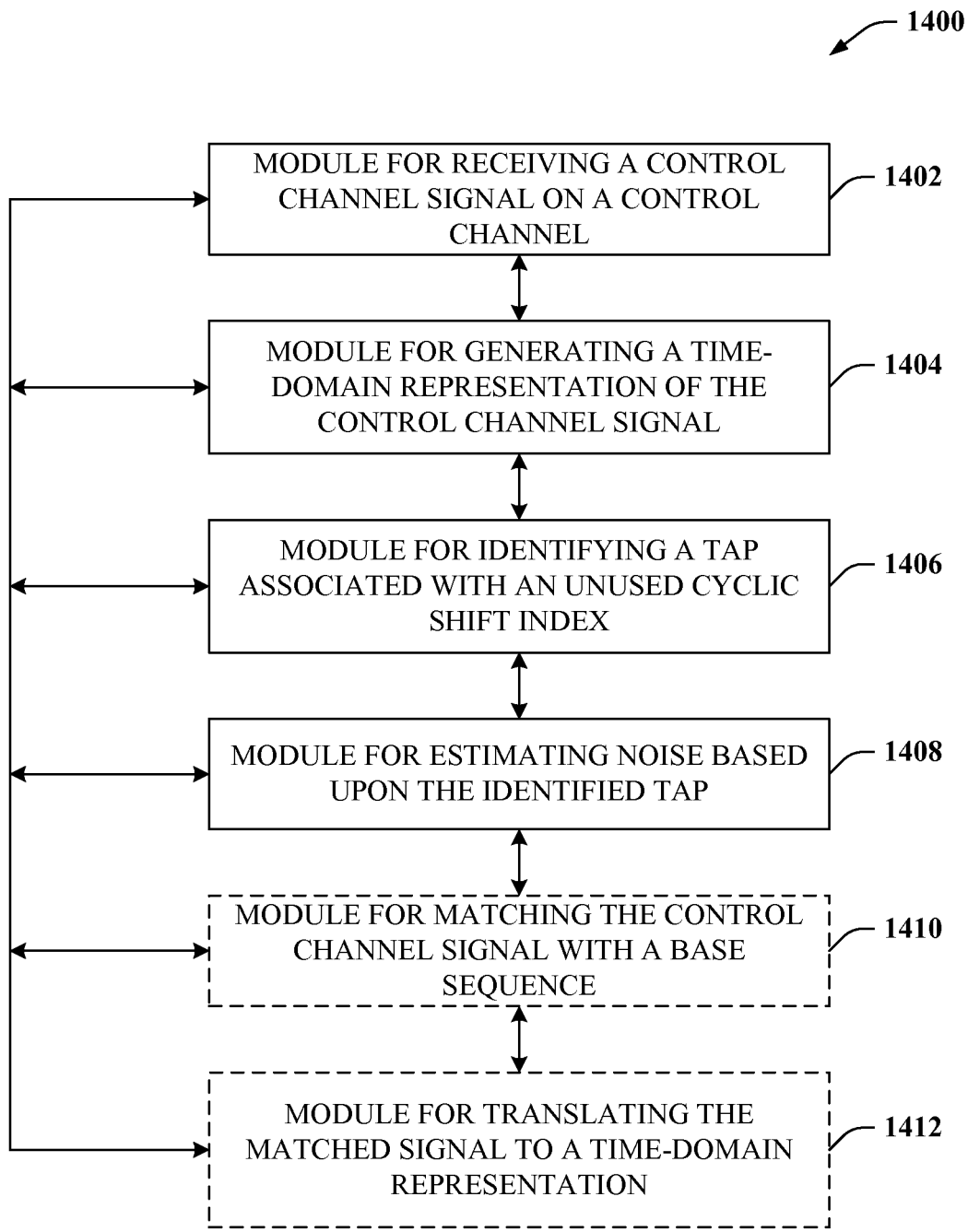
FIG. 14 is an illustration of an example apparatus that facilitates noise estimation on a control channel in accordance with various aspects.

Turning to FIG. 14, an apparatus 1400 that facilitates noise estimation on a control channel is illustrated. It is to be appreciated that apparatus 1400 is represented as including functional blocks, which can be functional blocks that represent functions implemented by a processor, software, or combination thereof (e.g., firmware). Apparatus 1400 can be implemented by a base station (e.g., eNB 110) and/or any other suitable network entity. Apparatus 1400 can include a module 1402 for receiving a control channel signal on a control channel, a module 1404 for generating a time-domain representation of the control channel signal, a module 1406 for identifying a tap associated with an unused cyclic shift index, a module 1408 for estimating noise based upon the identified tap. In addition, apparatus 1400 can include an optional module 1410 for matching the control channel signal with a base sequence, and an optional module 1412 for translating the matched signal to a time-domain representation.

Figure 15:
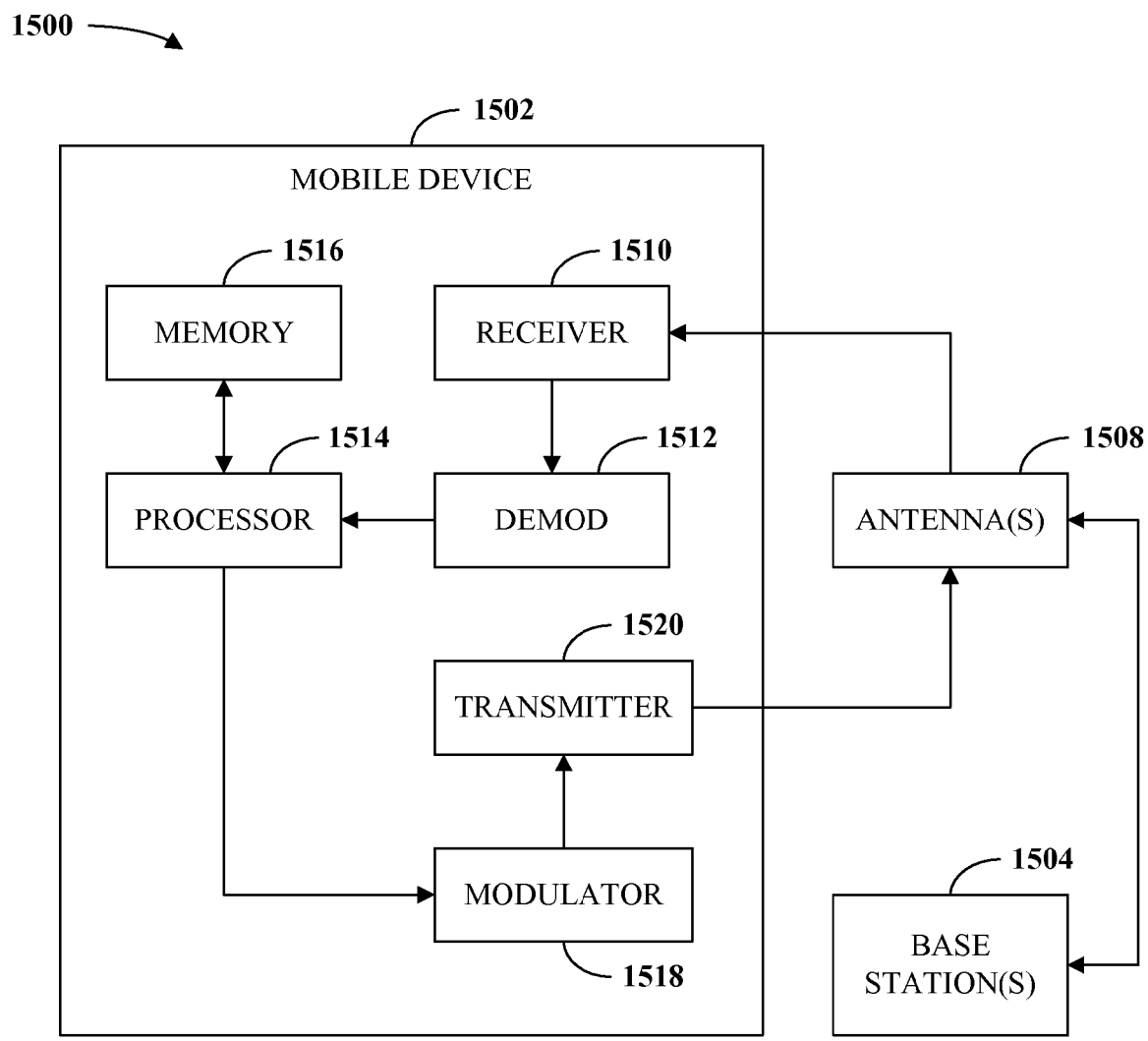
FIGS. 15-16 are block diagrams of respective wireless communication devices that can be utilized to implement various aspects of the functionality described herein.

FIG. 15 is a block diagram of another system 1500 that can be utilized to implement various aspects of the functionality described herein. In one example, system 1500 includes a mobile device 1502. As illustrated, mobile device 1502 can receive signal(s) from one or more base stations 1504 and transmit to the one or more base stations 1504 via one or more antennas 1508. Additionally, mobile device 1502 can comprise a receiver 1510 that receives information from antenna(s) 1508. In one example, receiver 1510 can be operatively associated with a demodulator (Demod) 1512 that demodulates received information. Demodulated symbols can then be analyzed by a processor 1514. Processor 1514 can be coupled to memory 1516, which can store data and/or program codes related to mobile device 1502. Mobile device 1502 can also include a modulator 1518 that can multiplex a signal for transmission by a transmitter 1520 through antenna(s) 1508.

Figure 16:
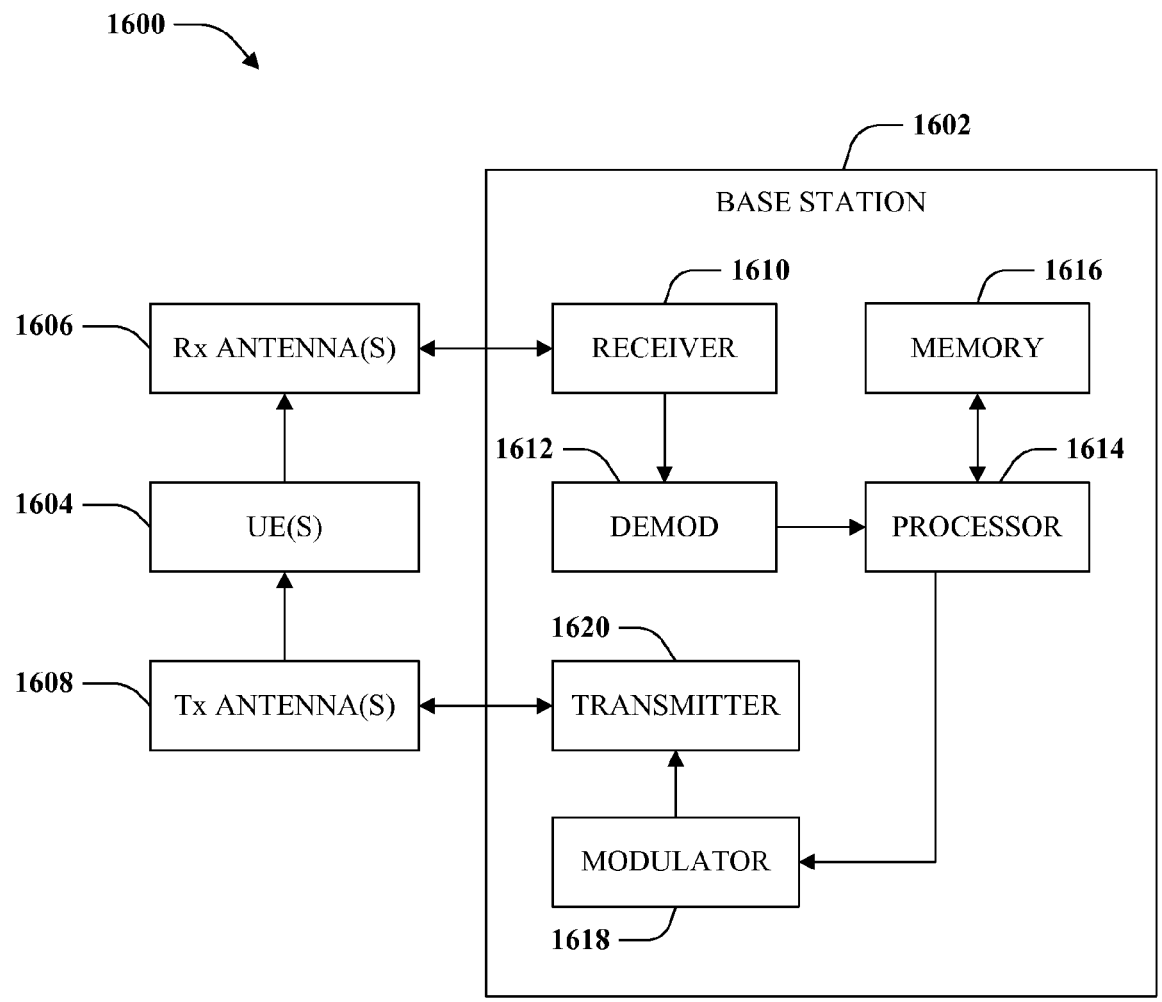

FIG. 16 is a block diagram of a system 1600 that can be utilized to implement various aspects of the functionality described herein. In one example, system 1600 includes a base station or base station 1602. As illustrated, base station 1602 can receive signal(s) from one or more UEs 1604 via one or more receive (Rx) antennas 1606 and transmit to the one or more UEs 1604 via one or more transmit (Tx) antennas 1608. Additionally, base station 1602 can comprise a receiver 1610 that receives information from receive antenna(s) 1606. In one example, the receiver 1610 can be operatively associated with a demodulator (Demod) 1612 that demodulates received information. Demodulated symbols can then be analyzed by a processor 1614. Processor 1614 can be coupled to memory 1616, which can store information related to code clusters, access terminal assignments, lookup tables related thereto, unique scrambling sequences, and/or other suitable types of information. Base station 1602 can also include a modulator 1618 that can multiplex a signal for transmission by a transmitter 1620 through transmit antenna(s) 1608.

Figure 17:
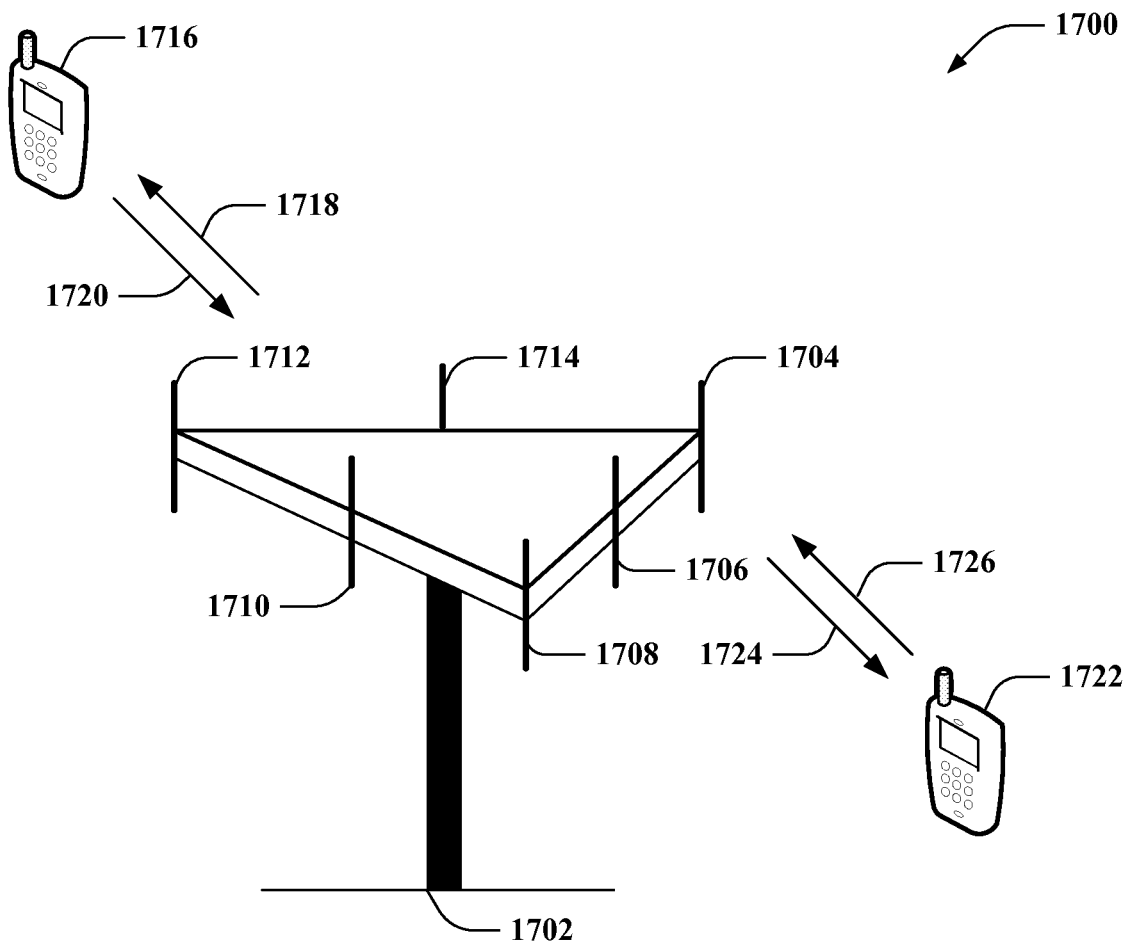
FIG. 17 is an illustration of a wireless communication system in accordance with various aspects set forth herein.

Referring now to FIG. 17, a wireless communication system 1700 is illustrated in accordance with various embodiments presented herein. System 1700 comprises a base station (e.g., access point) 1702 that can include multiple antenna groups. For example, one antenna group can include antennas 1704 and 1706, another group can comprise antennas 1708 and 1710, and an additional group can include antennas 1712 and 1714. Two antennas are illustrated for each antenna group; however, more or fewer antennas can be utilized for each group. Base station 1702 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 1702 can communicate with one or more UEs such as UE 1716 and UE 1722; however, it is to be appreciated that base station 1702 can communicate with substantially any number of UEs similar to UEs 1716 and 1722. UEs 1716 and 1722 can be, for example, cellular phones, smart phones, laptops, handheld communication devices, handheld computing devices, satellite radios, global positioning systems, PDAs, and/or any other suitable device for communicating over wireless communication system 1700. As depicted, UE 1716 is in communication with antennas 1712 and 1714, where antennas 1712 and 1714 transmit information to UE 1716 over a downlink 1718 and receive information from UE 1716 over an uplink 1720. Moreover, UE 1722 is in communication with antennas 1704 and 1706, where antennas 1704 and 1706 transmit information to UE 1722 over a downlink 1724 and receive information from UE 1722 over an uplink 1726. In a frequency division duplex (FDD) system, downlink 1718 can utilize a different frequency band than that used by uplink 1720, and downlink 1724 can employ a different frequency band than that employed by uplink 1726, for example. Further, in a time division duplex (TDD) system, downlink 1718 and uplink 1720 can utilize a common frequency band and downlink 1724 and uplink 1726 can utilize a common frequency band.

Each group of antennas and/or the area in which they are designated to communicate can be referred to as a sector of base station 1702. For example, antenna groups can be designed to communicate to UEs in a sector of the areas covered by base station 1702. In communication over downlinks 1718 and 1724, the transmitting antennas of base station 1702 can utilize beamforming to improve signal-to-noise ratio of downlinks 1718 and 1724 for UEs 1716 and 1722. Also, while base station 1702 utilizes beamforming to transmit to UEs 1716 and 1722 scattered randomly through an associated coverage, UEs in neighboring cells can be subject to less interference as compared to a base station transmitting through a single antenna to all its UEs. Moreover, UEs 1716 and 1722 can communicate directly with one another using a peer-to-peer or ad hoc technology (not shown).

According to an example, system 1700 can be a multiple-input multiple-output (MIMO) communication system. Further, system 1700 can utilize substantially any type of duplexing technique to divide communication channels (e.g., downlink, uplink, . . . ) such as FDD, FDM, TDD, TDM, CDM, and the like. In addition, communication channels can be orthogonalized to allow simultaneous communication with multiple devices or UEs over the channels; in one example, OFDM can be utilized in this regard. Thus, the channels can be divided into portions of frequency over a period of time. In addition, frames can be defined as the portions of frequency over a collection of time periods; thus, for example, a frame can comprise a number of OFDM symbols. The base station 1702 can communicate to the UEs 1716 and 1722 over the channels, which can be created for various types of data. For example, channels can be created for communicating various types of general communication data, control data (e.g., quality information for other channels, acknowledgement indicators for data received over channels, interference information, reference signals, etc.), and/or the like.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 18:
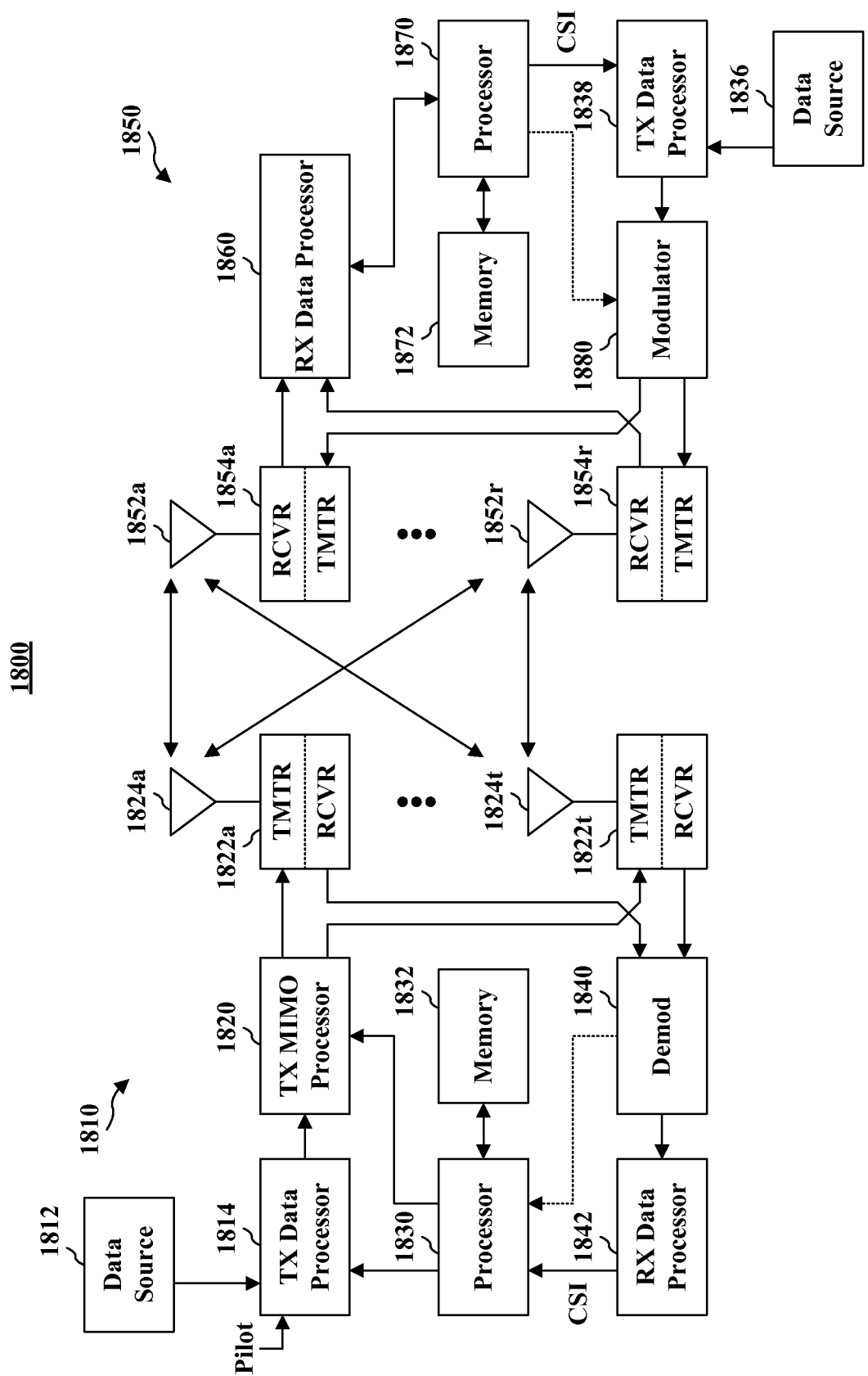
FIG. 18 is a block diagram illustrating an example wireless communication system in which various aspects described herein can function.

FIG. 18 shows an example wireless communication system 1800. The wireless communication system 1800 depicts one base station 1810 and one access terminal 1850 for sake of brevity. However, it is to be appreciated that system 1800 can include more than one base station and/or more than one access terminal, wherein additional base stations and/or access terminals can be substantially similar or different from example base station 1810 and access terminal 1850 described below. In addition, it is to be appreciated that base station 1810 and/or access terminal 1850 can employ the systems (FIGS. 1, 8, 10, and 13-14) and/or method (FIGS. 11-12) described herein to facilitate wireless communication there between.

At base station 1810, traffic data for a number of data streams is provided from a data source 1812 to a transmit (TX) data processor 1814. According to an example, each data stream can be transmitted over a respective antenna. TX data processor 1814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 1850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 1830.

The modulation symbols for the data streams can be provided to a TX MIMO processor 1820, which can further process the modulation symbols (e.g., for OFDM). TX MIMO processor 1820 then provides $N_T$ modulation symbol streams to $N_T$ transmitters (TMTR) 1822a through 1822t. In various embodiments, TX MIMO processor 1820 applies beamforming weights to the symbols of the data streams and to the antenna from which the symbol is being transmitted.

Each transmitter 1822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 1822a through 1822t are transmitted from $N_T$ antennas 1824a through 1824t, respectively.

At access terminal 1850, the transmitted modulated signals are received by $N_R$ antennas 1852a through 1852r and the received signal from each antenna 1852 is provided to a respective receiver (RCVR) 1854a through 1854r. Each receiver 1854 conditions (e.g., filters, amplifies, and downconverts) a respective signal, digitizes the conditioned signal to provide samples, and further processes the samples to provide a corresponding "received" symbol stream.

An RX data processor 1860 can receive and process the $N_R$ received symbol streams from $N_R$ receivers 1854 based on a particular receiver processing technique to provide $N_T$ "detected" symbol streams. RX data processor 1860 can demodulate, deinterleave, and decode each detected symbol stream to recover the traffic data for the data stream. The processing by RX data processor 1860 is complementary to that performed by TX MIMO processor 1820 and TX data processor 1814 at base station 1810.

A processor 1870 can periodically determine which available technology to utilize as discussed above. Further, processor 1870 can formulate a reverse link message comprising a matrix index portion and a rank value portion.

The reverse link message can comprise various types of information regarding the communication link and/or the received data stream. The reverse link message can be processed by a TX data processor 1838, which also receives traffic data for a number of data streams from a data source 1836, modulated by a modulator 1880, conditioned by transmitters 1854a through 1854r, and transmitted back to base station 1810.

At base station 1810, the modulated signals from access terminal 1850 are received by antennas 1824, conditioned by receivers 1822, demodulated by a demodulator 1840, and processed by a RX data processor 1842 to extract the reverse link message transmitted by access terminal 1850. Further, processor 1830 can process the extracted message to determine which precoding matrix to use for determining the beamforming weights.

Processors 1830 and 1870 can direct (e.g., control, coordinate, manage, etc.) operation at base station 1810 and access terminal 1850, respectively. Respective processors 1830 and 1870 can be associated with memory 1832 and 1872 that store program codes and data. Processors 1830 and 1870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), an Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim. Furthermore, the term "or" as used in either the detailed description or the claims is meant to be a "non-exclusive or."

What is claimed is:

1. A method of wireless communication, comprising:
   receiving a control channel signal from a UE on a control channel;
   generating a time-domain representation of the control channel, the time-domain representation including a plurality of signals separated in time;
   identifying a tap, in the time-domain representation, that corresponds to an unused cyclic shift index; and
   estimating noise associated with the control channel signal based at least in part on the tap.

2. The method of claim 1, further comprising:
   matching the control channel signal with a base sequence to generate a matched signal from the control channel signal; and
   applying an inverse discrete Fourier transform to generate the time-domain representation.

3. A wireless communications apparatus, comprising:
   a processor;
   memory in electronic communication with the processor; and
   instructions stored in the memory and operable, when executed by the processor, to cause the wireless communications apparatus to:
   receive a control channel signal from a UE on a control channel;
   generate a time-domain representation of the control channel, the time-domain representation including a plurality of signals separated in time;
   identify a tap, in the time-domain representation, that corresponds to an unused cyclic shift index; and
   estimate noise associated with the control channel signal based at least in part on the tap.

4. The wireless communications apparatus of claim 3, wherein the instructions are operable to cause the apparatus to:
   match the control channel signal with a base sequence to generate a matched signal from the control channel signal; and
   apply an inverse discrete Fourier transform to generate the time-domain representation.

5. A wireless communications apparatus, comprising:
means for receiving a control channel signal from a UE on a control channel;
means for generating a time-domain representation of the control channel, the time-domain representation including a plurality of signals separated in time;
means for identifying a tap, in the time-domain representation, that corresponds to an unused cyclic shift index; and
means for estimating noise associated with the control channel signal based at least in part on the tap.

6. The apparatus of claim 5, further comprising:
means for matching the control channel signal with a base sequence to generate a matched signal from the control channel signal; and
means for translating the matched signal to the time-domain representation.

7. A computer program product for wireless communications, comprising:
a non-transitory computer-readable medium, comprising:
code for receiving a control channel signal from a UE on a control channel;
code for generating a time-domain representation of the control channel, the time-domain representation including a plurality of signals separated in time;
code for identifying a tap, in the time-domain representation, that corresponds to an unused cyclic shift index; and
code for estimating noise associated with the control channel signal based at least in part on the tap.

8. The computer program product of claim 7, where the non-transitory computer-readable medium further comprises:
code for matching the control channel signal with a base sequence to generate a matched signal from the control channel signal; and
code for applying an inverse discrete Fourier transform to generate the time-domain representation.

9. A wireless communications apparatus, comprising:
a control channel receive module configured to receive a control channel signal from a UE on a control channel;
a separation module configured to generate a time-domain representation of the control channel, the time-domain representation including a plurality of signals separated in time;
the separation module configured to identify a tap, in the time-domain representation, that corresponds to an unused cyclic shift index; and
an estimation module configured to estimate noise associated with the control channel signal based at least in part on the tap.

10. The wireless communications apparatus of claim 9, wherein the separation module is further configured to:
match the control channel signal with a base sequence to generate a matched signal from the control channel signal; and
utilize an inverse discrete Fourier transform to generate the time-domain representation.

\* \* \* \* \*